(12) United States Patent
Endo et al.

(10) Patent No.: US 6,519,528 B2
(45) Date of Patent: Feb. 11, 2003

(54) VEHICLE NAVIGATION APPARATUS PROVING PROPER GUIDANCE FOR OFF-ROAD NET CONDITIONS

(75) Inventors: Kouichi Endo, Iwaki (JP); Yoshikazu Sato, Iwaki (JP); Kan Shishido, Wako (JP)

(73) Assignees: Alpine Electronics Inc., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/066,579

(22) Filed: Feb. 6, 2002

(65) Prior Publication Data
US 2002/0072849 A1 Jun. 13, 2002

Related U.S. Application Data

(62) Division of application No. 09/350,775, filed on Jul. 9, 1999, which is a continuation of application No. 08/755,276, filed on Nov. 22, 1996, now abandoned.

(30) Foreign Application Priority Data

Dec. 28, 1995 (JP) ................................. 7-342645

(51) Int. Cl.⁷ ............................................. G01C 21/30
(52) U.S. Cl. ..................................................... 701/211
(58) Field of Search ................................ 701/211, 208, 701/200; 340/988, 990, 995

(56) References Cited

U.S. PATENT DOCUMENTS

| 4,796,191 A | | 1/1989 | Honey et al. ............... 701/217 |
|---|---|---|---|
| 5,323,152 A | | 6/1994 | Morita ....................... 340/988 |
| 5,343,399 A | * | 8/1994 | Yokoyama et al. ......... 364/449 |
| 5,412,573 A | | 5/1995 | Barnea et al. .............. 701/211 |
| 5,757,289 A | * | 5/1998 | Nimura et al. .............. 340/995 |
| 5,796,613 A | | 8/1998 | Kato et al. .................. 701/214 |

* cited by examiner

Primary Examiner—Yonel Beaulieu
(74) Attorney, Agent, or Firm—Arent Fox Kintner Plotkin & Kahn, PLLC

(57) ABSTRACT

A vehicle navigation apparatus that does not output an inappropriate or irrelevant guidance picture display or spoken guidance even when the vehicle enters an area off the roads (e.g. a parking lot, campus, factory, or facility grounds, or park) stored in the apparatus' road map data base, and which provides a correct guidance picture display and a correct spoken guidance for navigation to a destination. When the apparatus detects entry of the vehicle into such an area off the roads stored in the map data base, a guidance picture is changed to a map picture, and the apparatus stops correcting the vehicle position by map matching. When the apparatus detects an exit of the vehicle from such an area, the apparatus restarts correcting the vehicle position by map matching and a map picture is changed to a guidance picture.

3 Claims, 22 Drawing Sheets

FIG. 2
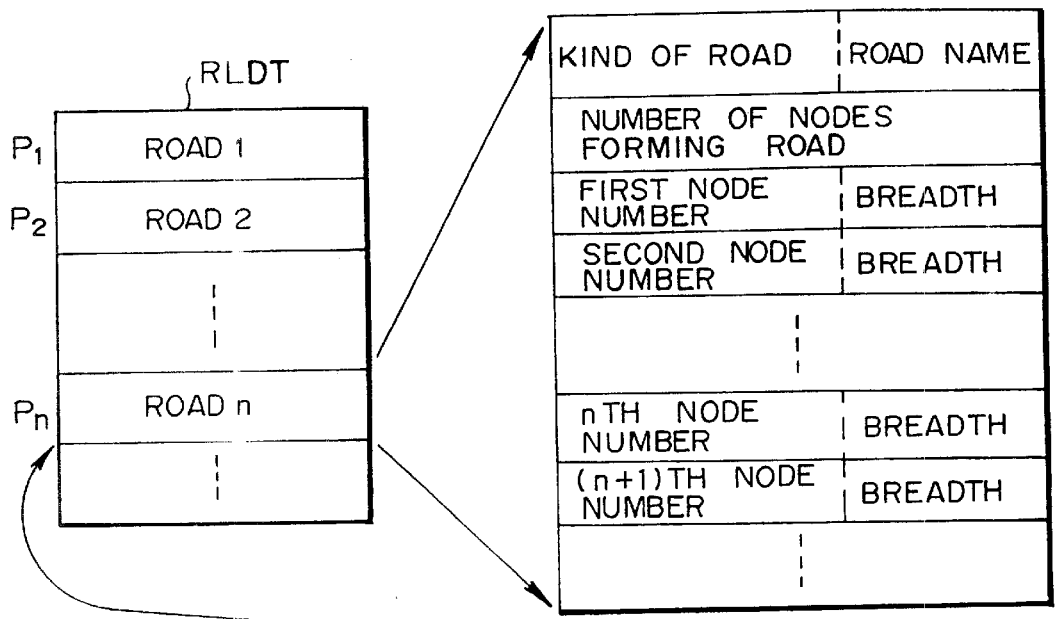
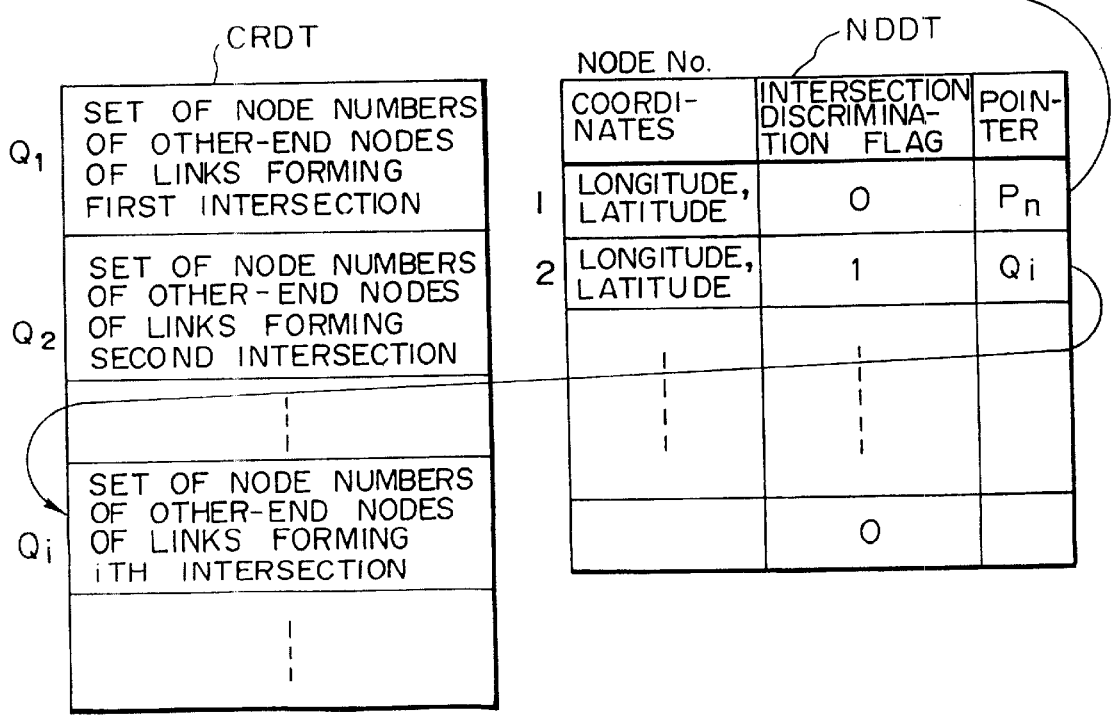

— GUIDE ROUTE
• NODE

FIG. 19
PRIOR ART

| SPEECH GUIDANCE |
|---|
| GO STRAIGHT THROUGH THE NEXT INTERSECTION |
| TURN RIGHT AT THE NEXT INTERSECTION |
| TURN OFF TO THE RIGHT AT THE NEXT INTERSECTION |
| TURN LEFT AT THE NEXT INTERSECTION |
| TURN OFF TO THE LEFT AT THE NEXT INTERSECTION |

VEHICLE NAVIGATION APPARATUS PROVING PROPER GUIDANCE FOR OFF-ROAD NET CONDITIONS

This is a Divisional Application of application Ser. No. 09/350,775 filed Jul. 9, 1999, which in turn is a Continuation Application of application Ser. No. 08/755,276, filed Nov. 22, 1996 (now abandoned). The disclosure of the prior applications is hereby incorporated by reference herein in its entirety.

BACKGROUND OF THE INVENTION

1. Field of the Invention

The present invention relates generally to navigation apparatuses and, more particularly, to a navigation apparatus in which a guide picture for guiding a motor vehicle to a destination is displayed on a display unit.

2. Description of the Related Art

A vehicle navigation apparatus of a well known type performs vehicle travel guidance, enabling a driver to easily drive the vehicle to a desired destination. The navigation apparatus detects the position of the vehicle, reads out map data pertaining to an area at the vehicle position from e.g. a CD-ROM (compact disk read-only memory), and displays a map image on a display screen while superposing a mark representing the position of the vehicle (user's vehicle position mark) on a predetermined portion of the map image. As the present position of the vehicle changes with movement of the vehicle, the vehicle position mark in the image is moved or the map is scrolled while the vehicle position mark is fixed at a predetermined position, for example, at the center of the image, thereby enabling the driver to recognize the map information of the area at the vehicle position at a glance.

Such a navigation apparatus has a route guidance function for setting a guided route from a starting point to a destination and performing intersection guidance (displaying an enlarged intersection diagram and the direction in which a vehicle is to advance) while displaying the guided route on a map. When a starting point and a destination are input, a guide route control section of the navigation apparatus automatically determines a most suitable guided route and successively stores nodes (in terms of longitude and latitude) constituting the guided route in a memory. During actual traveling, the node series stored in the memory is searched for a portion of the guided route to be displayed on a map display area of the display screen and the portion of the guided route is displayed so as to be discriminable from other routes. When the vehicle is within a predetermined distance of and approaching an intersection, an intersection guidance diagram (an enlarged intersection diagram with an arrow indicating the direction in which the vehicle is to travel at the intersection) is displayed to inform the driver of the desired one of the roads or directions at the intersection. If the vehicle deviates from the guided route (off-route travel), the guided route is updated by recalculating a new route from the present vehicle position to the destination.

FIG. 17 is a diagram of an example of a guided route display containing a vehicle mark CM, a guided route RT (dotted line) and an enlarged intersection diagram EL1 of an intersection Q. The enlarged intersection diagram EL1 showing intersection formation links B1 to B4, represented by link figures having a predetermined width, is converted into a perspective view (as shown) before being displayed. Each link is displayed with a name of a place to which a corresponding route leads (OHMIYA, TOKOROZAWA, URAWA STATION, NIHONBASHI). An arrow ARR is also displayed to indicate the direction in which the guided route leads to the destination. To draw such an enlarged intersection diagram as shown in FIG. 18, an area through 360° about the intersection Q is divided into eight equal sections symmetrical about the direction of entry into the intersection (the direction of an intersection entry link L1), thereby obtaining eight angular ranges (reverse-to-entry-direction range A1, off-to-lower-left range A2, left turn range A3, off-to-upper-left range A4, straight drive range A5, off-to-upper-right range A6, right turn range A7, off-to-lower-right range A8). Then the relationship between intersection formation links and the angular ranges is examined to determine the angular ranges within which the intersection formation links fall, and an enlarged intersection diagram is formed and drawn in which the entry and diverging links extend in directions corresponding to the angular ranges within which the intersection formation links fall.

FIG. 19 is a table showing spoken intersection guidance sentences of the navigation apparatus. If the direction of an exit link corresponds to the right turn direction, spoken guidance such as "Turn right at the next intersection" is given. If the direction of an exit link corresponds to the off-to-upper-right direction, spoken guidance such as "Turn off to the right at the next intersection" is given. In some navigation systems, intersection guidance is not performed when driving straight through the intersection.

The vehicle navigation apparatus described above corresponds to those of the type commonly used in Japan. A vehicle navigation apparatus representative of the type commonly used in U.S.A. is arranged to display guidance pictures such as those shown in FIGS. 20A to 20F, without displaying a map picture showing a map and a vehicle position mark during vehicle traveling, and to guide a driver by using spoken information for designating the direction in which to drive. In each of the guidance pictures shown in FIGS. 20A to 20F, the distance (in miles) to an intersection is indicated in a space CDS; the distance (in miles) to a destination is indicated in a space DDS; sign VCD indicates a state of providing spoken guidance; the present time is displayed in a space TDL; and a heading direction is indicated in a guidance image NVG. If there is no intersection or a branching point in a guided route within a predetermined distance of the present vehicle position, a guidance picture such as FIG. 20A designating straight travel is displayed. If there is an intersection being approached within the predetermined distance, a guidance picture such as one of FIGS. 20B to 20E is displayed which contains an enlarged diagram of the intersection or branching point and an arrow indicating a heading direction. Where a U-turn is required, a U-turn figure as shown in FIG. 20F is displayed. When a point at a predetermined distance from the branching point or intersection is reached, spoken guidance is provided to designate a heading direction.

The navigation apparatus of the type used in the U.S.A. displays guidance pictures instead of map pictures during navigation, as described above. However, it detects the position of the vehicle, reads out map data corresponding to the vehicle position from a map data base such as a CD-ROM, displays, by using map data, an enlarged diagram of an approached intersection or a branching point, which may exist in a guide route in a predetermined distance range from the present vehicle position, along with an arrow indicating a heading direction in the same manner as the intersection enlarged diagram display in the Japanese type navigation apparatus, and performs speech guidance by designating the heading direction. The navigation apparatus displays a guidance picture indicating driving straight if there is no branching point or intersection being approached within the predetermined distance.

If the navigated vehicles moves off of the guided route (off-route travel), the navigation apparatus updates the guided route by recalculating a new route from the present vehicle position to the destination. Further, at the time of guided route setting, the display changes to show a map picture, thereby enabling a starting point and a destination to be input for guided route setting.

As described above, the navigation apparatuses of the types in Japan and U.S.A. have generally the same internal configurations. Reduced to essentials, they differ only in display picture control.

The vehicle position is measured by self-contained navigation sensors (a distance sensor and a bearing sensor) mounted in the vehicle (self-contained navigation) or by a global positioning system (GPS) including a satellite (satellite navigation). Vehicle position measurement based on self-contained navigation can be performed at a comparatively low cost but entails the problem of sensor errors reducing the measuring accuracy, and therefore requires correction processing such as map matching processing. Satellite navigation enables absolute-position detection. However, measured position data obtained by satellite navigation includes drift position errors resulting from various causes. The nominal accuracy of the U.S. GPS system is 100 m or less (95% of the time). Satellite navigation also entails the problem of position detection failure in e.g. a tunnel or a building where the satellite radio signals are obstructed.

Vehicle navigation apparatuses using both self-contained navigation and satellite navigation have recently been developed to avoid these problems. In such navigation apparatuses, the position and bearing are dead-reckoned by self-contained navigation in an ordinary situation, and the dead-reckoned vehicle position is corrected by map matching processing to determine the actual vehicle position on a traveled road. If the navigation apparatus is disabled from map matching by some cause with the result that the vehicle position measured by self-contained navigation deviates from the actual vehicle position so that the distance between the vehicle position measured by self-contained navigation and vehicle position measured by the GPS exceeds an error range of the GPS, then the position measured by the GPS is used as a corrected vehicle position, to find the traveled road by map matching processing, thereby determining the actual vehicle position.

In self-contained navigation, the vehicle position is detected by integration of output signals from a distance sensor and a relative direction sensor, as described below. FIG. 21 is a diagram of a vehicle position detection method using self-contained navigation. The distance sensor is assumed to output a pulse each time a unit distance $L_0$ is traveled by the vehicle. A reference bearing ($\theta=0$) corresponding to the plus direction of X-axis is set, and the direction of anticlockwise rotation from the reference bearing is assumed to be a plus direction. If a preceding vehicle position is represented by a point $P_0$ ($X_0$, $Y_0$); an absolute bearing of a vehicle heading at the point $P_0$ is $\theta_0$; and an output from the relative bearing sensor when the unit distance $L_0$ is traveled is $\Delta\theta_1$, a change in the vehicle position is represented by $\Delta X = L_0 \cdot \cos(\theta_0 + \Delta\theta_1)$ $\Delta Y = L_0 \cdot \sin(\theta_0 + \Delta\theta_1)$ A dead-reckoned bearing $\theta_1$ of the vehicle heading direction and a dead-reckoned vehicle position ($X_1$, $Y_1$) at a present point P1 can be calculated by vector addition expressed by the following equations:

$$\theta_1 = \theta_0 + \Delta\theta_1 \tag{1}$$

$$X_1 = X_0 + \Delta X = X_0 + L_0 \cdot \cos\theta_1 \tag{2}$$

$$Y_1 = Y_0 + \Delta Y = Y_0 + L_0 \cdot \sin\theta_1 \tag{3}$$

Accordingly, if the absolute bearing and the position coordinates at a starting point are given, the vehicle position can be detected (dead-reckoned) in a real time manner by repeating the calculation of equations (1) to (3) each time the vehicle moves through the unit distance.

In self-contained navigation, however, errors are accumulated during traveling, so that the dead-reckoned position deviates from the traveled road. Therefore, the dead-reckoned vehicle position is collated with road data by map matching processing to be corrected to the actual vehicle position on the road. FIGS. 22 and 23 are diagrams explaining map matching based on a projection method. It is assumed here that the present vehicle position is at a point $P_{i-1}(X_{i-1}, Y_{i-1})$, and that the vehicle heading direction is $\theta_{i-1}$ (FIG. 22 shows a case where the point $P_{i-1}$ does not coincide with a road RDa.) If a relative bearing when a certain distance $L_0$ (e.g. 10 m) is traveled from the point $P_{i-1}$ is $\Delta\theta_i$, a vehicle position $P_i'(X_i', Y_i')$ dead-reckoned by self-contained navigation and a dead-reckoned bearing $\theta_i$ at $P_i'$ are obtained by the following equations:

$$\theta_i = \theta_{i-1} + \theta_{i-1}$$

$$X_i' = X_{i-1} + L_0 \cdot \sin\theta_i$$

$$Y_i' = Y_{i-1} + L_0 \cdot \sin\theta_1$$

In this situation, (a) road data is searched for a link (an element constituting a road) which is contained in a 200 m square area surrounding the dead-reckoned vehicle position $P_i'$, to which a perpendicular having a length not larger than a certain distance (e.g., 100 m) can be drawn from the dead-reckoned vehicle position $P_i'$, and which is at an angle not larger than a certain value (e.g. 45°) from the dead-reckoned vehicle bearing $\theta_i$ at the dead-reckoned position $P_i'$. In this case, a link $LKa_1$ of a bearing $\theta a_1$ on the road RDa (straight line connecting nodes $Na_0$ and $Na_1$) and a link $LKb_1$ of a bearing $\theta b_1$ on a road RDb (straight line connecting nodes $Nb_0$ and $Nb_1$) are searched out as such a link. (b) Then the lengths of perpendiculars RLia and RLib drawn from the dead-reckoned vehicle position $P_i'$ to the links $LKa_1$ and $LKb_1$ are obtained. (c) Thereafter, a coefficient Z is calculated by the following equations:

$$Z = dL \cdot 20 + d\theta \cdot 20 \, (d\theta \leq 35°) \tag{4}$$

$$Z = dL \cdot 20 + d\theta \cdot 40 \, (d\theta > 35°) \tag{4'}$$

where dL is the length of the perpendicular drawn from the dead-reckoned vehicle position $P_i'$ to each link (the distance between the dead-reckoned vehicle position and the link) and d$\theta$ is the angle between the dead-reckoned vehicle bearing $\theta_i$ and the link. A larger weighting function is used when the angle d$\theta$ is large.

(d) After the coefficient value Z has been obtained, some of the links satisfying the following conditions 1, 2, and 3,:

1) Distance dL$\leq$75 m (=maximum absorbable distance),
2) Angular difference d$\theta\leq$30° (=maximum absorbable angle),
3) Coefficient value Z$\leq$1500 are obtained and the one having the smallest coefficient value in the links satisfying these conditions, i.e. link $LKa_1$ in this case, is set as a matching candidate (most probable road). (e) Then a travel locus SHi connecting the points $P_{i-1}$ and $P_i'$ is translated in a direction along the perpendicular RLia until the point $P_{i-1}$ comes onto the link $LKa_1$ (or an extension of the link $LKa_1$) to obtain translated points $PT_{i-1}$ and PTi' of the points $P_{i-1}$ and $P_i'$ (f) Finally, the travel locus SHi is rotated on the point $PT_{i-1}$ until the point PTi' comes onto the link $LKa_1$ (or an extension of the link $LKa_1$) to obtain a moved point of the point PTi', which is set as an actual vehicle position $P_i$ $(X_i, Y_i)$. The bearing $\theta_i$ is preserved as the vehicle heading at the actual vehicle position $P_i$. In a case where the point $P_{i-1}$ representing the preceding vehicle position is on the road RDa, the translated point $PT_{i-1}$ coincides with the point $P_{i-1}$, as shown in FIG. 23.

A situation described below may be taken into consideration, especially in the U.S.A. and geographically similar countries. As shown in FIG. 24, a convenience store SHP1 and other stores SHPi (i=2, 3 . . . ) are all located in a large-area site, a large parking area PKA is located in front of the stores, and roads RD1 to RD4 stored in the map data base surround the parking area PKA. The roads RD1 to RD4 are at a short distance from the parking area PKA. The parking area PKA is not stored in the map data base (i.e., is off the road net). If a vehicle CR having the navigation apparatus enters the parking area PKA, the vehicle position is erroneously determined to be on the adjacent road RD1 by the map matching processing, resulting in an error in position correction. Thereafter, the navigation apparatus cannot recognize the correct vehicle position and cannot make an appropriate guidance picture display or spoken guidance when the vehicle moves out of the parking area PKA back onto a road on a guided route.

In a situation where a guided route is set as indicated by hatching in FIG. 25, if the vehicle position is determined to be on the road RD1 adjacent to the parking area PKA by the map matching processing to cause an erroneous position correction, then an off-route movement is recognized, a guided route recalculation is performed to newly set guided route NVRT indicated by the double-dot-dash line, and a guidance picture display and spoken guidance which are inappropriate or irrelevant are provided. For example, in a case where the vehicle CR is travelling leftward through a point Pa, a correct guidance picture such as that shown in FIG. 26A designating a right turn 500 m ahead is displayed. In such a situation, if the vehicle enters the parking area PKA and if the vehicle position is erroneously corrected to a point on the road RD1 by map matching, then recalculation of guided route NVRT is performed as mentioned above to display an incorrect guidance picture, such as that shown in FIG. 26B designating a left turn 100 m ahead. Then, if the vehicle makes a U-turn in the parking area PK4 as indicated by the broken line, it is erroneously determined that the vehicle has U-turned on the road RD1 and a guidance picture as shown in FIG. 26C designating a U-turn is displayed. If the vehicle returns to the road RD2, guided route recalculation is performed, the first guided route (hatching) is obtained and a guidance picture such as that shown in FIG. 26D designating a right turn 200 m ahead is displayed.

As described above, if the vehicle enters an area other than on the roads (i.e. not in the map data base), e.g. a parking lot, grounds of a facility or factory, a park or a campus, the selection of guidance pictures and spoken guidance becomes incorrect during movement in the off-road area, so that the driver has a feeling of uncertainty in terms of guidance. Even after the vehicle exits the off-road area, there is a possibility of the navigation apparatus performing erroneous position correction to lose the vehicle position, resulting in failure to display a correct guidance picture or to give correct spoken guidance.

SUMMARY

A navigation apparatus in accordance with this invention does not output an inappropriate or irrelevant guidance picture display or spoken guidance, even when the navigated vehicle enters an area other than on the roads in the map data base, e.g., a parking lot, factory or facility grounds, a park or a campus.

The present navigation apparatus also displays a correct guidance picture and performs correct speech guidance for navigating the vehicle to a destination when the vehicle exits such an area (an "off-road net area").

According to one aspect of the present invention, a navigation apparatus includes a map data base for storing map data, a detector for detecting an entry of a vehicle into such an area other than roads stored in the map data base, and a display control for changing a guidance picture to a map picture showing a map image surrounding the vehicle position and a vehicle position mark when the vehicle enters the off-road net area.

In this navigation apparatus, when the vehicle enters such an off-road net area, the guidance picture is changed to a map picture to avoid outputting an erroneous guidance picture display or guidance speech, so that the driver has no feeling of uncertainty. Also, a detector for detecting an exit from such an area is provided to change the map picture to the guidance picture when the vehicle exits the area, thereby providing a guidance picture display and spoken guidance for navigation to a destination after exiting from the area.

According to another aspect of the present invention, a navigation apparatus includes a map data base for storing map data, a vehicle position corrector for obtaining, by map matching processing, a most probable candidate road satisfying a predetermined condition for correcting the position of the vehicle to a point on the most probable candidate road, and for thereafter continuing the map matching processing each time a predetermined distance is traveled, a detector for detecting an entry of the vehicle into an off-road net area, and a display control for changing a guidance picture to a map picture showing a map image about the vehicle position and a vehicle position mark when the vehicle enters the area, wherein correcting the position by the map matching processing stops when the vehicle enters the area.

In this navigation apparatus, when the vehicle enters such an area, a guidance picture is changed to a map picture and correcting the vehicle position by map matching stops, thereby avoiding occurrence of erroneous position correction to a position on a road adjacent to the area. Therefore, the possibility of providing an erroneous guidance picture display or spoken guidance is eliminated, so that the driver has no feeling of uncertainty.

A detector for detecting an exit from such an area is also provided to restart correcting the vehicle position by map matching and to change the map picture for a guidance picture when the vehicle exits the area. Even after exiting from the area, this navigation apparatus can recognize the vehicle position with a certain error, such that the vehicle position can be corrected by the restated map matching processing. Also, a correct guidance picture display and a correct spoken guidance to the desired destination can be output.

According to still another aspect of the present invention, a navigation apparatus includes a map data base for storing map data, a vehicle position corrector for obtaining, by map matching processing, a most probable candidate road satisfying a predetermined condition, for correcting the position of a vehicle to a point on the most probable candidate road, and for thereafter continuing the map matching processing each time a predetermined distance is traveled, a route calculator for calculating a guide route from the present vehicle position of a vehicle to a destination when the vehicle deviates from a destination previously set, a detector for detecting an entry of the vehicle into an off-road net area, and a display control for changing a guidance picture to a map picture showing a map image surrounding the vehicle position and a vehicle position mark when the vehicle enters the area, wherein, when the vehicle enters the area, the vehicle position correction means stops correcting the position by the map matching processing and the guided route calculator stops calculating the guided route.

In this navigation apparatus, when the vehicle enters the above-mentioned area, a guidance picture is changed to a map picture, correcting the vehicle position by map matching stops and recalculating a guided route is also stopped, thereby avoiding occurrence of erroneous position correction to a position on a road adjacent to the area, while recalculation of a guided route in response to being off-route is inhibited. Therefore the possibility of providing an erroneous guidance picture display or spoken guidance is eliminated, so that the driver has no feeling of uncertainty.

Also, a detector for detecting an exit from such an area is provided to restart correcting the vehicle position by map matching and recalculating a guide route when the vehicle exits the area. Even after the exit from the area, this navigation apparatus can recognize the vehicle position with a certain error, such that the vehicle position can be corrected by the restarted map matching processing. Also, a correct guidance picture display and a correct spoken guidance to the desired destination can be provided. Further, even if the vehicle exits from the area at a location different from the entrance, to travel on a road different from the previously set guided route, a new guided route is recalculated, to provide a correct guidance picture display and correct spoken guidance for navigation to the destination.

BRIEF DESCRIPTION OF THE DRAWINGS

FIG. 2 is a diagram showing the structure of road data in terms map data for the apparatus of FIG. 1;

FIG. 19 is a table showing prior art spoken guidance;

DETAILED DESCRIPTION

Navigation System

1. System Configuration

Figure 1:
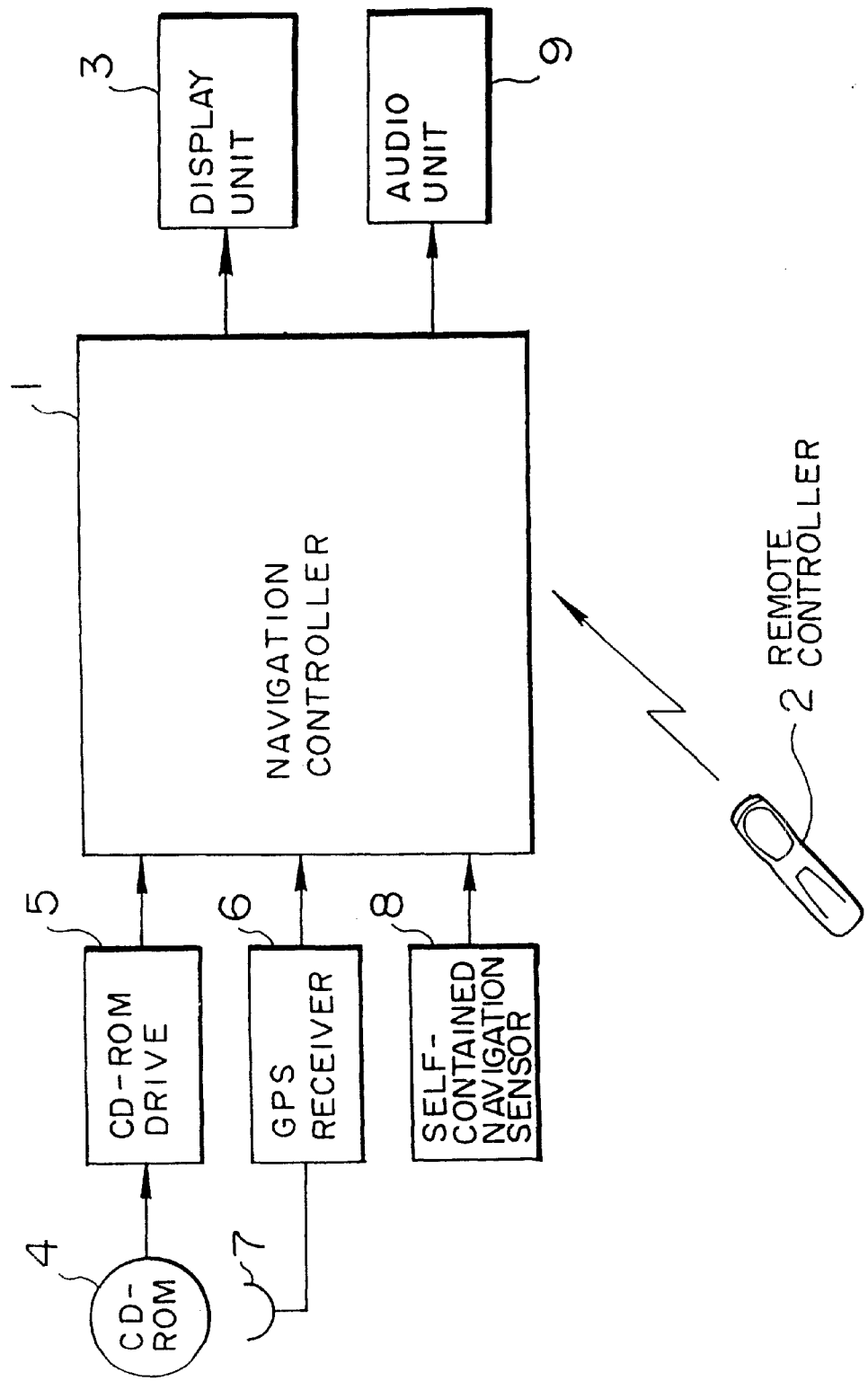
FIG. 1 is a diagram of the present navigation system.

FIG. 1 shows a navigation system in accordance with this invention, including a navigation controller 1, an operating unit (e.g. a remote controller) 2 for inputting various instructions to the navigation controller, setting a guided route and setting various kinds of data, and a display unit 3 for displaying a map, a guide route, an intersection guidance diagram, various menus, and the like. The navigation system also includes a compact disk read only memory (CD-ROM 4) in which the map data base information is stored, an associated CD-ROM drive 5, a GPS receiver 6 for receiving radio signals from GPS satellites to measure the present position and bearing of the vehicle, a multiple beam antenna 7 for receiving the radio signals from the GPS satellites, a sensor 8 for self-contained navigation, and an audio unit 9 for outputting spoken guidance. The audio unit 9 may be adapted for use with or be part of an ordinary car audio system.

The GPS receiver 6 calculates the position and bearing of the navigated vehicle by three-dimensional or two dimensional position-measuring processing (the bearing being obtained as a line connecting the present vehicle position and the vehicle position measured one sampling time ΔT before), and outputs the calculated position and bearing along with the position-measuring time. The self-contained navigation sensor 8 includes various sensors described below with reference to FIG. 4.

The map information stored in the CD-ROM 4 includes (1) a road layer, (2) a background layer for displaying objects on a map, (3) a character layer for displaying names of cities, towns, villages and the like, (4) an integrated information service (IIS) layer for storing IIS information. Of these layers, the road layer has, as shown in FIG. 2, road link data RLDT, node data NDDT and crossing data CRDT.

Road link data RLDT is provided as information on attributes of roads and includes a total number of nodes in a road, the numbers, of nodes forming each road, road numbers (road names) and the kinds of road (national road, expressway, prefectural road and so on). (The roads are represented in the map database as each being a series of segments linked at nodes defined in terms of latitude and longitude.)

Crossing data CRDT is a set of nodes closest to each intersection on a map (intersection forming nodes) in the nodes of links (road segments) connecting to the intersection. Node data NDDT is a list of all nodes defining each road and has, with respect to each node, position information (longitude, latitude), an intersection discrimination flag for indicating whether the node corresponds to an intersection, and a pointer which designates intersection data if the node corresponds to an intersection or designates the road link to which the node belongs if the node corresponds to no intersection.

2. Remote Controller

Figure 3:
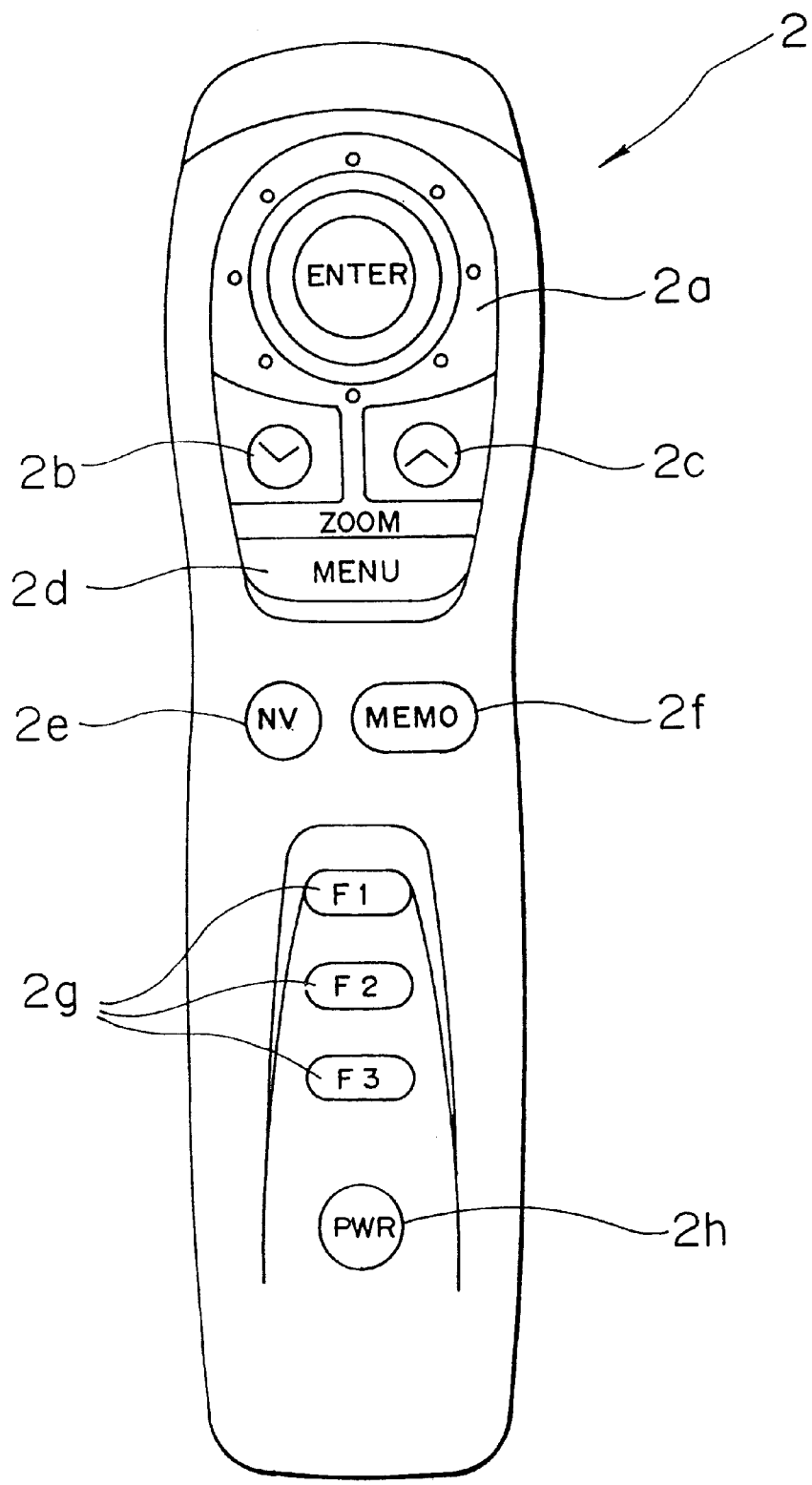
FIG. 3 is a diagram of a remote controller for use with the apparatus of FIG. 1.

FIG. 3 shows the appearance of the remote controller 2 of FIG. 1 having various keys. Joystick key 2a is operated to move a cursor (focus), a vehicle mark or the like in eight directions relative to a map or to select a desired menu item by moving a menu selecting bar in vertical and horizontal directions, and is depressed when a menu is selected. Enlargement key 2b is operated to display a map on such a comparatively large scale as to show the map details. Reduction key 2c is operated to display a wide-area map. Menu key 2d is operated to display a menu. Navigation (NV) key 2e is for displaying a map containing a point corresponding to the user's vehicle position along with the user's vehicle mark. Memory (MEMO) key 2f is operated to store a desired point. Functions frequently used are set in combination with function keys 2g and are each selected by operating the corresponding one of function keys 2g. Key 2h is the power key.

Navigation Controller

Figure 4:
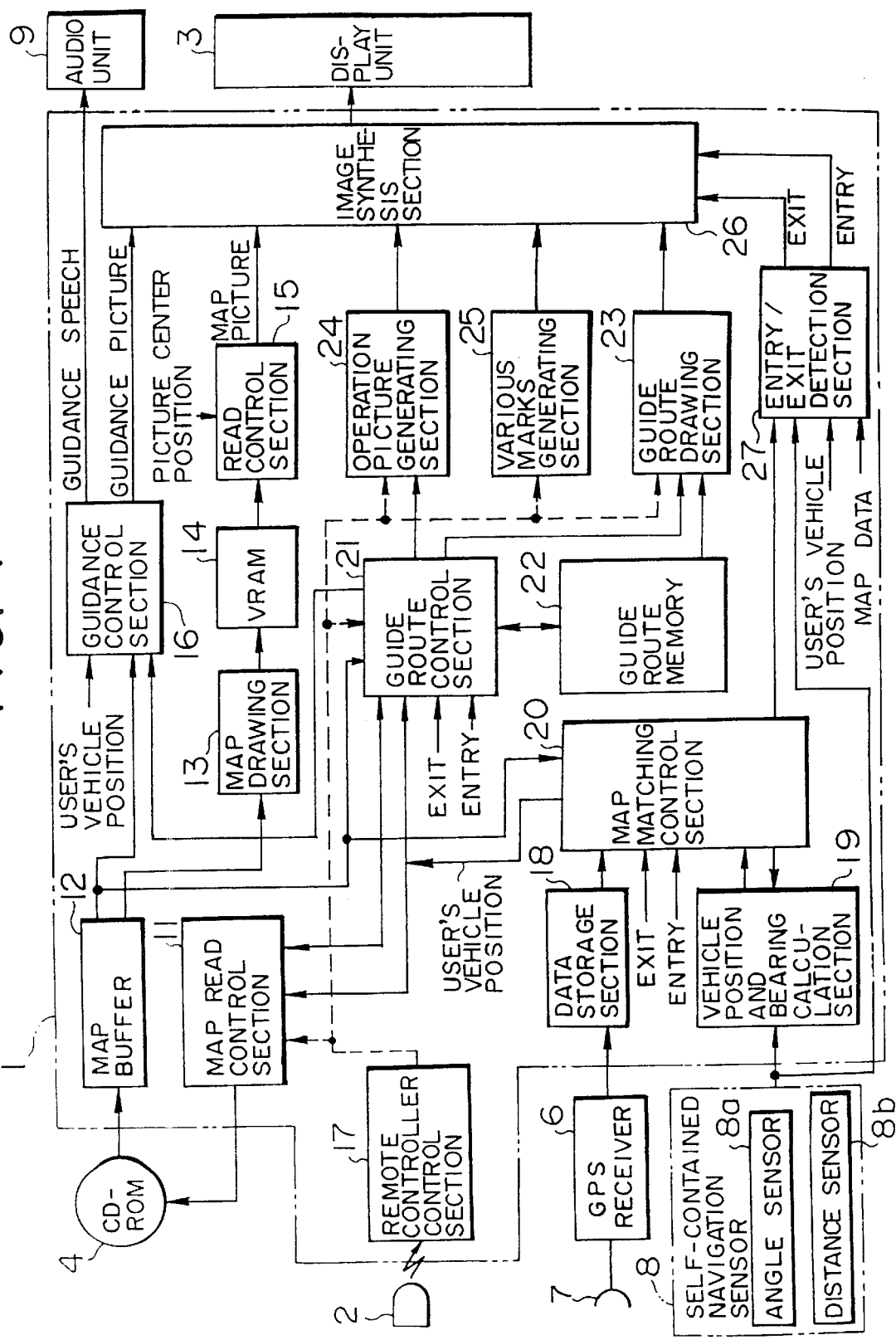
FIG. 4 is a detailed diagram of the present navigation apparatus in accordance with the present invention.

FIG. 4 shows detail of the navigation controller 1 of FIG. 1 along with the remote controller 2, the display unit 3, the CD-ROM 4 in which map information is stored, and the CD-ROM drive 5, the GPS receiver 6, the multiple beam antenna 7, the self-contained navigation sensor 8 and the audio unit 9. The self-contained navigation sensor 8a includes a relative direction sensor (angle sensor) 8a such as a gyrocompass for detecting the angle of rotation of the vehicle, and a distance sensor 8b which generates one pulse each time a predetermined distance is traveled.

The navigation controller 1 has a map reading control section 11 for 1) calculating a focus position (picture center longitude and latitude) in response to moving a map or selecting a map area by the joystick key, the reduction key, the enlargement key or the like, and 2) reading predetermined map information from the CD-ROM 4 on the basis of the vehicle position, the focus position or the like. Map buffer 12 stores map information read out from the CD-ROM. Map information for a plurality of pages (units), e.g., 3×3 units of map information surrounding the current vehicle position or the focus position is read to the map buffer 12 to enable map scrolling described below. Map drawing section 13 generates a map image by using map information stored in the map buffer 12. Video random access memory (VRAM) 14 stores the map image. Read control section 15 displays a map while scrolling the same according to the movement of the vehicle position or focus movement by changing the position of one picture cut out from the VRAM 14 on the basis of the picture center position (vehicle position, focus position).

It is to be understood that controller 1 typically includes a microprocessor or microcontroller executing a computer program (instructions) stored in a computer-readable memory (medium) associated with the microprocessor/microcontroller. Certain blocks of controller 1 represent other electronic components, e.g. VRAM 14, data storage section 18, and guide route memory 18 are memory. The computer program (a computer process) is described in further detail below; coding such a program is well within the skill of one of ordinary skill in the art in light of this disclosure.

A guidance control section 16 forms and outputs a guidance picture (see FIG. 20) for guiding the driver to the destination, and guides the driver by informing the driver of a direction to be selected at a branching point or intersection. Remote controller control section 17 receives a signal according to an operation of the remote controller 2 and sends commands to related sections according to the signal. GPS data storage section 18 stores GPS data supplied from the GPS receiver 6. Vehicle position and bearing calculation section 19 calculates the vehicle position (dead-reckoned vehicle position) and a vehicle bearing on the basis of an output from the self-contained navigation section 8. Map matching control section 20 performs map matching processing based on a projection method by using map information read to the map buffer 12, the dead-reckoned vehicle position and the vehicle bearing each time a predetermined distance (e.g., 10 m) is traveled, thereby correcting the vehicle position to a point on a traveled road.

Figure 5:
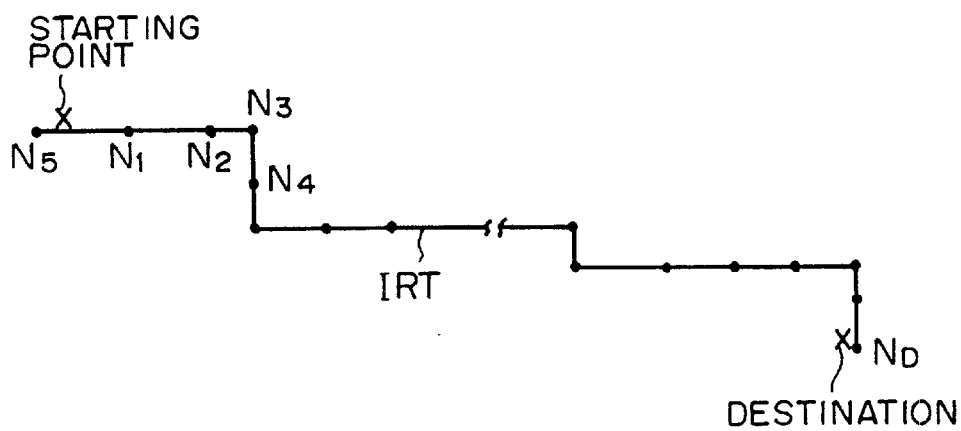
FIG. 5 is a diagram of a node series forming a guided route.
Figure 6:
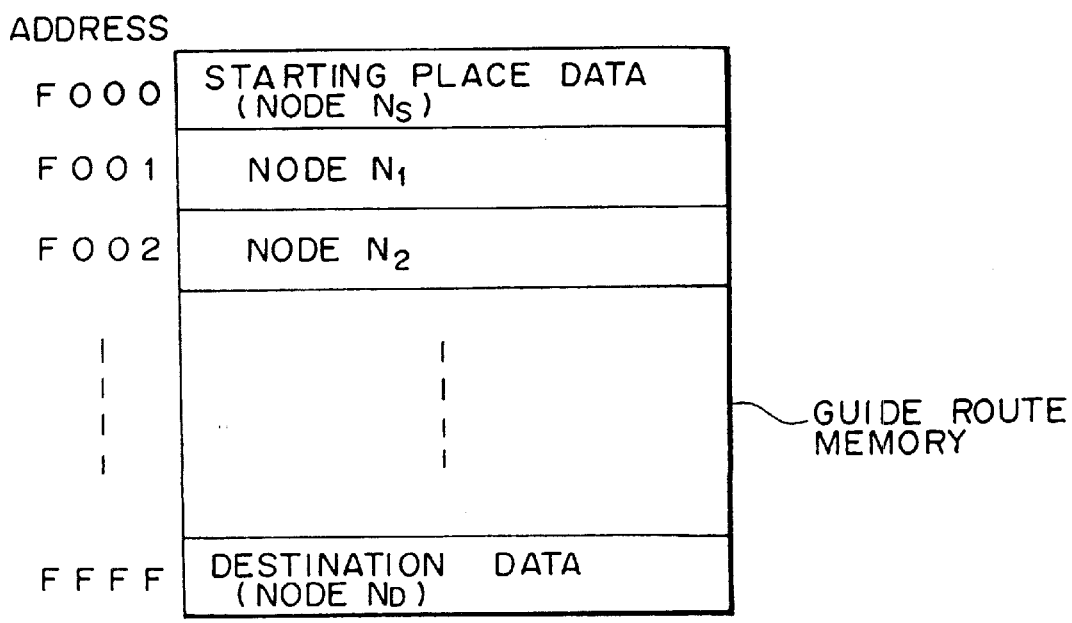
FIG. 6 is a diagram showing guided route data stored in a guided route memory.

Guided route control section 21 performs calculations for determining a guided route to an input destination and recalculates a guided route from the present vehicle position to the destination. Guided route memory 22 stores the guided route. Guided route drawing section 23 draws the guide route stored in the guide route memory 22. The guided route memory 22 stores data on the positions of all nodes $N_s$, $N_i$ (i=1, 2 . . . ), $N_D$ on a guided routed IRT (see FIG. 5) from a starting point to a destination calculated by the guided route control section 21, as shown in FIG. 6. When a map picture is displayed, the guided route drawing section 23 reads out guide route information (a node series) from the guided route memory 22 and draws the corresponding guided route on the map.

Operation picture generating section 24 displays various menu pictures (operation pictures) on display 3. Mark generating section 25 outputs various marks including the vehicle mark and the cursor at the time of map picture display. Image synthesis section 26 drives display 3.

Entry/exit detection section 27 detects entry of the navigated vehicle into an area other than roads stored in the map data base (off the road net) and an exit of the vehicle from such an area.

Entry/Exit Detection Section

1. Area Entry Detection Conditions

Figure 7:
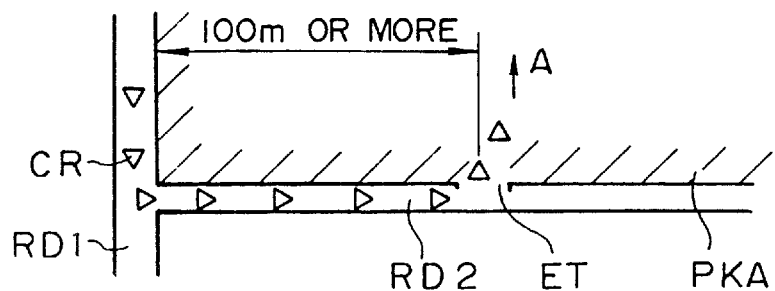
FIG. 7 is a diagram explaining a first set of area entry detection conditions.
Figure 8:
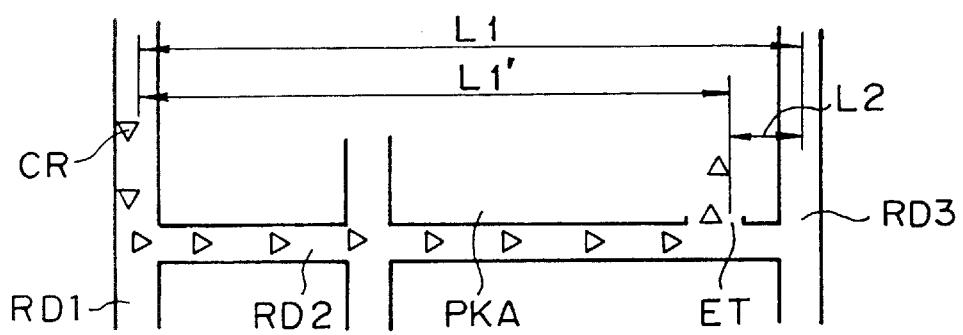
FIG. 8 is a diagram explaining a second set of area entry detection conditions (Part 1)

FIGS. 7 and 8 are diagrams explaining the principle of detection of entry of the navigated vehicle into an area other than roads stored in the map data base. FIGS. 7 and 8 illustrate an area PKA other than the stored roads (e.g., a parking lot), roads RDi (i=1, 2 . . . ) stored in the data base, and the navigated vehicle location CR.

A first set of area entry conditions is 1) that the heading of the vehicle changes by 60° or more, 2) that the speed of the vehicle at the time of this change is 20 km/h or less, and 3) that no road exists as a map matching calculation object (candidate road). The condition that no candidate road exists is expressed as a case where no road can be found as a link defined (1) by being contained in a 200 m square area surrounding the dead-reckoned position, (2) by being at an angle not larger than a certain value (e.g., 45°) from the vehicle bearing at the dead-reckoned position, and (3) by having thereon a perpendicular drawn from the dead-reckoned position and having a length not larger than a certain distance (e.g., 100 m).

Entry into area PKA, e.g. a parking lot, is made almost always 1) by reducing the vehicle speed to 20 km/h or less and 2) by gradually changing the direction of movement of the vehicle by 60° or more, as shown in FIG. 7. However, such a driving situation may occur in the case of traveling on a road. Therefore, there is a need to set some additional condition to enable detection of entry into the above-mentioned off-road net area. As long as the vehicle is traveling on a road, a candidate road is always found by map matching. However, if in the case of entry into an off-road net area, and the distance of all the roads generally parallel to the area entry direction A is 100 m or more, there is no candidate road to be found. Accordingly, the condition 3 is added to the set of conditions 1 and 2 and, if these conditions 1, 2 and 3 are satisfied, it is determined that the vehicle has entered an off-road net area.

However, the above-described first set of detection conditions is not sufficient. This is because there is a possibility of road RD3, generally parallel to the area entry direction, being at a distance not larger than 100 m from an entrance ET to an off-road net area. In such a case, a map matching candidate road exists and the area entry cannot be detected if only the first set of area entry conditions is set. Therefore, there is a need for an additional area entry condition.

A second set of area entry detection conditions is 1) that the vehicle heading changes by 60° or more, 2) that the vehicle speed at the time of this change is 20 km/h or less, and 3) that the distance L2 to any map matching candidate road is greater than 3% of the distance L1 on the road traveled straight to the turning point, and 4) that the distance to the map matching candidate road is 30 m or more.

Figure 9:
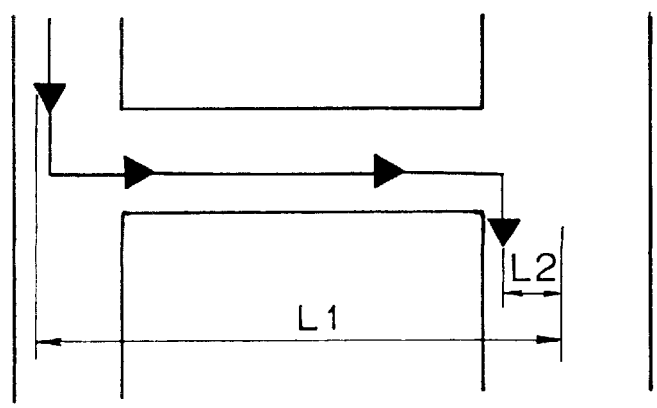
FIG. 9 is a diagram explaining the second set of area entry detection conditions (Part 2)

Entry into the above-described off-road net area must be detected even if road RD3 (map matching candidate road) generally parallel to the area entry direction is at a distance not greater than 100 m from the entrance ET to area PKA, as shown in FIG. 8. As long as the self-contained navigation sensor has no detection error, entry into area PKA can be determined if it is confirmed that the vehicle is not on the map matching candidate road RD3 generally parallel to the area entry direction when conditions 1 and 2 are satisfied. However, the self-contained navigation sensor has a detection error, and this detection error must be taken into consideration. Then, the distance Li' between a point at which the vehicle starts moving straight after changing its heading and a point at which it next changes the heading and the distance L2 between the second heading changing point (an entrance to the area) and map matching candidate road RD3 are obtained, and the ratio of L2 to the straight drive distance L1 (=Li'+L2) in terms of percent is calculated (see FIG. 9) by the following equation:

$$a = 100 \cdot L2/L1 \quad (5)$$

When the percent a is equal to or higher than a value set by considering the detection error, it is determined that entry into an off-road net area has been made. However, if the width of the traveled roads is large, a situation is possible in which the above-described conditions 1, 2 and 3 are satisfied. Therefore, the condition that "the distance to the map matching candidate road is not less than 30 m" is added to the above-described conditions by considering the width of the roads.

2. Area Exit Detection Conditions

When after entering an off-road net area, the vehicle exits from the area to travel on one of the roads, the vehicle speed is increased and a candidate road appears on which map matching is to be performed. Therefore, an exit from the area is determined if the conditions:

1) that the vehicle speed is e.g. 32 km/h or higher, and
2) that some candidate road exists on which map matching is to be performed are satisfied.

3. Configuration of the Entry/Exit Detection Section

Figure 10:
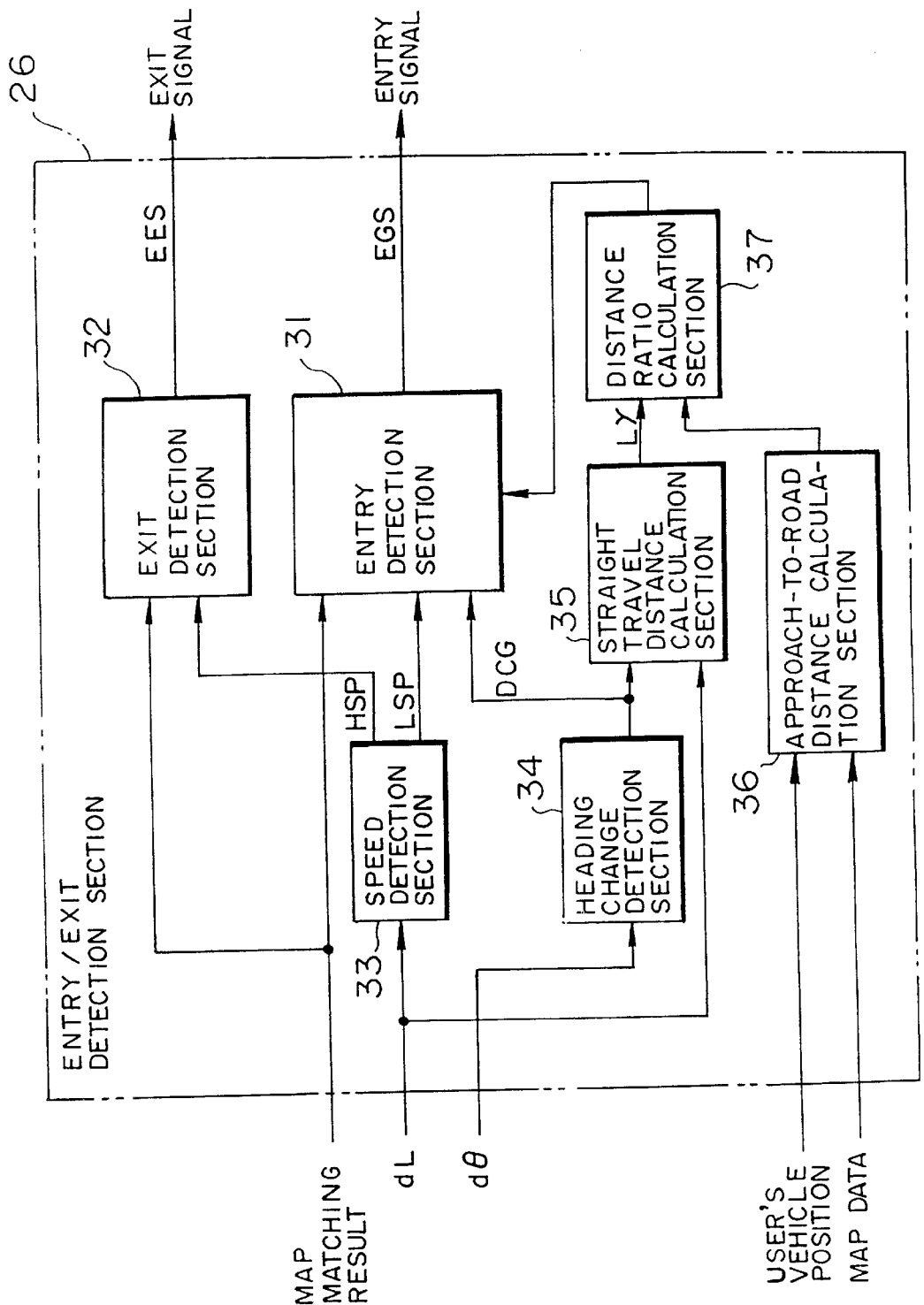
FIG. 10 is a diagram of the entry/exit detection section.

FIG. 10 is a diagram showing the entry/exit detection section 27 of controller 1. Entry detection section 31 detects an entry of the vehicle into an off-road net area. An exit detection section 32 detects an exit of the vehicle from such an area. Speed detection section 33 detects the speed of the vehicle on the basis of the distance dL traveled in a predetermined time, which distance is output from the self-contained navigation sensor. The speed detection section 33 outputs a low-speed signal LSP at logic high level when the vehicle speed is 20 km/h or less, and a high speed signal HSP at a high level when the vehicle speed is 32 km/h or greater. A heading change detection section 34 detects a change in the heading direction of the vehicle on the basis of a change dθ in the vehicle bearing output from the self-contained navigation sensor. The heading change detection section 34 outputs a direction change signal DCG when the heading direction changes by 60° or more in a predetermined time.

Straight travel distance calculation section 35 calculates the straight distance traveled from the time at which the vehicle heading direction changes by 60° or more. The straight travel distance calculation section 35 clears its internal storage of a stored straight travel distance in response to the direction change signal DCG, and thereafter accumulates the traveled distance dL output from the self-contained navigation sensor at predetermined time intervals to calculate the straight distance Li' traveled. Approach-to-road distance calculation section 36 of calculates the straight travel distance L2 (see FIG. 8) from the vehicle position to a map matching candidate road by using the vehicle position and the map data. It calculates the straight travel distance L2 when the vehicle heading direction changes by 60° or more. Distance ratio calculation section 37 calculates the ratio a (in terms of percent) of the straight travel distance L2 calculated by the approach-to-road distance calculation section 36 to the sum L1 (=Li'+L2) of the straight travel distance Li' calculated by the straight travel distance calculation section 35 and the distance L2 by equation (5).

The entry detection section 31 monitors whether or not the above-described first and second entry detection conditions are satisfied, and outputs an entry signal EGS if the conditions are satisfied. The exit detection section 32 monitors whether or not the area exit conditions are satisfied, and outputs an exit signal EES if the conditions are satisfied.

Map Matching Processing

Figure 11:
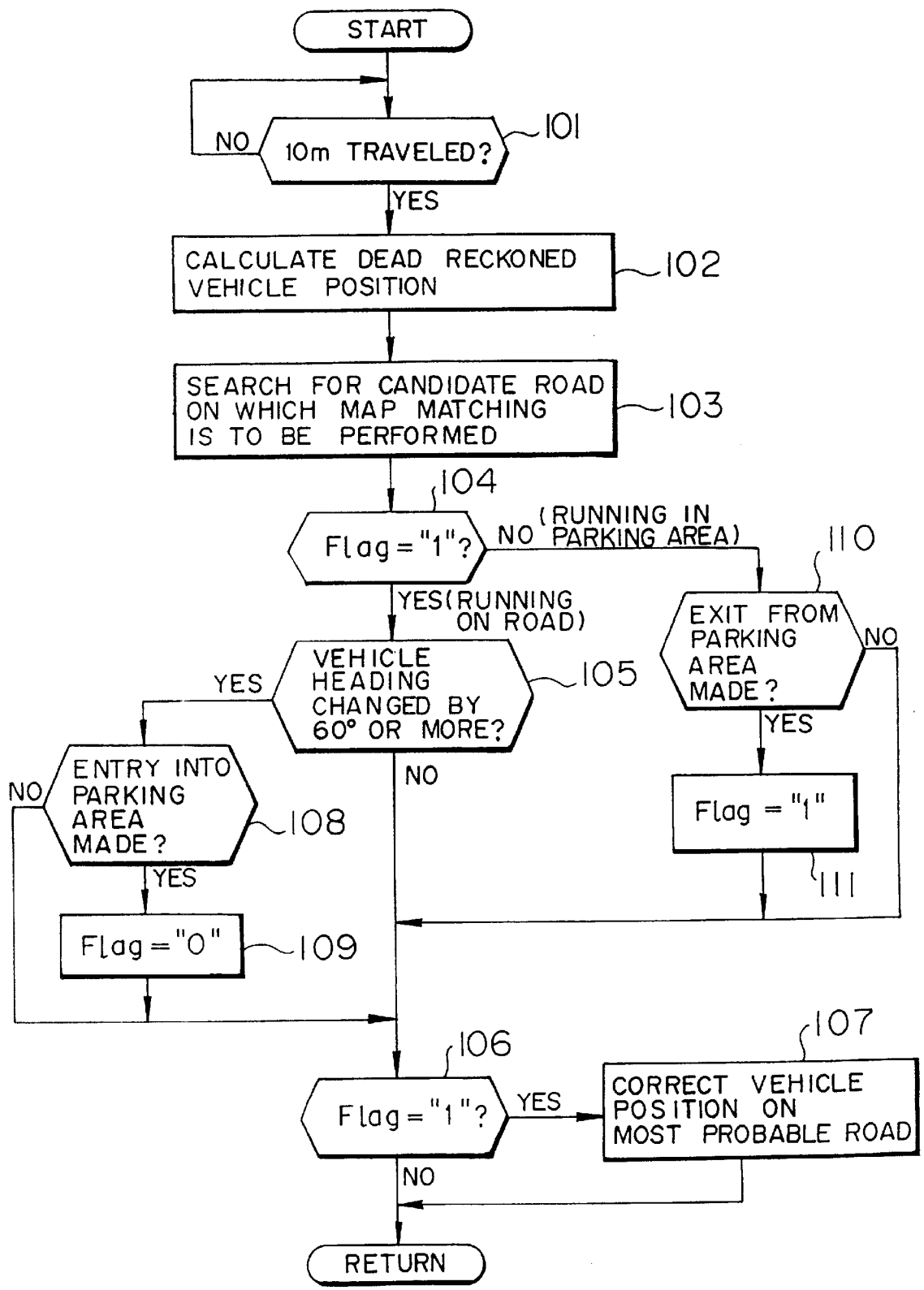
FIG. 11 is a flow chart of map matching control.

FIG. 11 is a flow chart of processing in the map matching control section 20.

The vehicle position calculation section 19 performs calculations of above equations (1) to (3) to dead-reckon the vehicle position coordinates X, Y and bearing θ each time a predetermined distance, e.g. 10 m, is traveled (Steps 101, 102). Then map matching processing based on the projection method using the map data and the vehicle position coordinates X, Y and bearing θ is dead-reckoned, thereby obtaining a candidate road on which map matching is to be performed (Step 103). Thereafter, a determination is made as to whether the vehicle is presently traveling in an off-road net area (e.g., a parking lot) or on a road (Step 104). In the case of traveling off the road net, Flag="0" In the case of traveling on a road, Flag="1".

In the case of traveling on a road, a check is made as to whether the vehicle heading has changed by 60° or more (Step 105). If NO, a check is made as to whether Flag="1" (the vehicle is traveling on a road) (Step 106). In the case of traveling on a road, the dead-reckoned vehicle position is corrected to a position on the candidate road (most probable road) on which the map matching is to be performed (Step 107). The process then returns to perform subsequent processing.

If it is determined in Step 105 that the vehicle heading has been changed by 60° or more, a check is made as to whether area entry signal EGS has been input from the entry/exit detection section 27 (Step 108). If this signal has not been input, it is determined that the change in heading is due to a turn at an intersection or the like, and the subsequent processing from Step 106 is performed. However, if area entry signal EGS has been input, it is determined that the vehicle has entered an off-road net area, and Flag='0' is set (Step 109). In this case, the result of determination in Step 106 is "NO", Step 107 is skipped over and position correction by map matching is not performed thereafter.

Thereafter, the process returns to continue processing from the start. After the vehicle has entered an off-road net area, the result of Step 104 is "NO" and a check is therefore made as to whether area exit signal EES has been input from the entry/exit detection section 27 (Step 110). If this signal has not been input, Step 107 is skipped over and position correction by map matching during traveling in the off-road net area is not performed.

On the other hand, in Step 110, if area exit signal EES has been input, it is determined that the vehicle has come out of the area and started traveling on a road, and Flag="1" is set (Step 111). In this case, the result of Step 106 is "YES" and position correction by map matching is started.

Guidance Control

Figure 12:
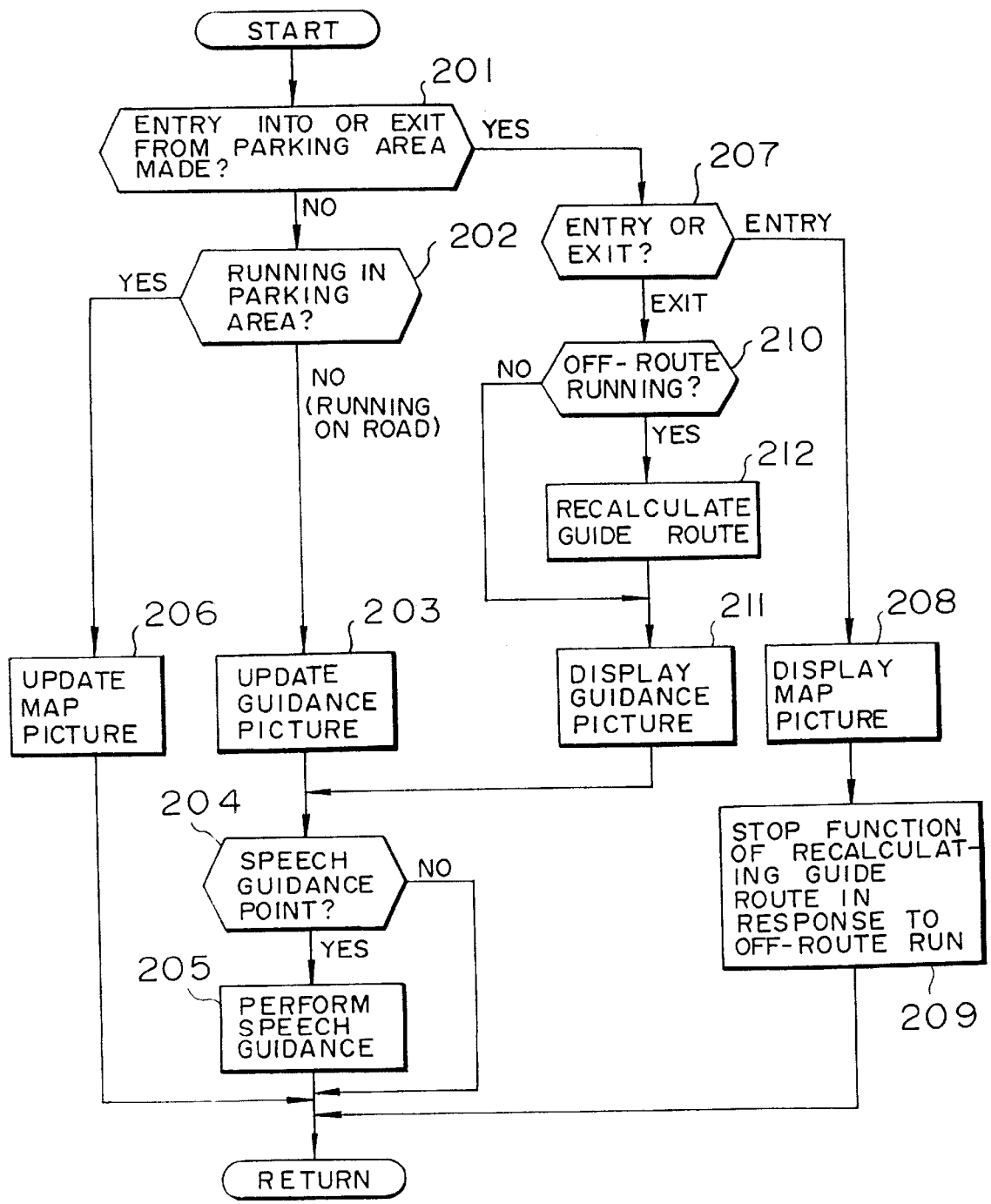
FIG. 12 is a flow chart of guidance control processing.

FIG. 12 is a flow chart of guidance control processing.

The image synthesis section 26 checks whether the vehicle has entered an off-road net area or whether the vehicle has come out of the area (step 201). If the vehicle has-neither entered such an area nor come out of the area, a check is made as to whether the vehicle is traveling in an off-road net area (e.g., in a parking lot) (Step 202). If the vehicle is instead traveling on a road, the image synthesis section 26 supplies the display unit 3 with a guidance picture (see FIG. 20) which is input to the image synthesis section 26 from the guidance control section 16. Thereafter, the guidance picture is updated with the progress of traveling on the road to be displayed on the display unit 3 (Step 203). Next, a check is made as to whether a spoken guidance point has been reached (Step 203). If a spoken guidance point is reached, spoken guidance is provided to designate the direction in which the vehicle is to move at an approached branching point or intersection (Step 205). The process then returns to perform subsequent processing. on the other hand, if it is determined in Step 202 that the vehicle is traveling in an off-road net area, the image synthesis section 26 combines a map image about the vehicle position output from the read control section 15 and the vehicle position mark output from the mark generating section 25 to form a map picture. The image synthesis section 26 supplies this map picture to the display unit 3 to display the map picture. Thereafter, the vehicle position mark is displayed by being moved relative to the map showing the area around the vehicle position according to the off-road net area travel of the vehicle (Step 206). During off-road net area travel, since position correction by map matching is not performed as mentioned above, the vehicle position mark is displayed while being moved according to the movement of the vehicle in the off-road net area (e.g. parking lot).

With respect to the above-described road traveling or off-road net area travel, if the vehicle enters an off-road net area or exits the area, the result of checking in Step 201 is "YES". In this case, the image synthesis section 26 determines an entry into or an exit from the area (Step 207). In the case of an entry into the area, the image synthesis section 26 changes the guidance picture to a map picture (Step 208). Also, in the case of entry into the off-road net area, the guide route control section 21 stops recalculating a guided route in response to off-route travel (Step 209). The map matching control section 20 stops the operation of correcting the vehicle position to a position on the most probable candidate road in response to the entry into the area. The process then returns to repeat the processing from the start, thereby updating the map picture (Step 206).

On the other hand, if it is determined in step 207 that the vehicle has exited the area, the guide route control section 21 checks whether the vehicle is traveling on a road other than the guided route (off-route travel) (Step 210). If the vehicle is not travelling off-route, the guided route control section 21 displays a guidance picture according to the same guide route (Step 211). Thereafter, the processing after Step 204 is repeated. However, off-route travel is recognized if the vehicle is traveling on a road other than the guided route after making an exit through a place different from the entrance at which the vehicle entered the off-road net area. In this case, the guided route control section 21 recalculates a guided route from the present vehicle position to the destination (Step 212) and thereafter displays a guidance picture according to the guide route obtained by recalculation (Step 211). The processing from Step 204 is thereafter repeated.

Examples of Picture Display

Figure 13:
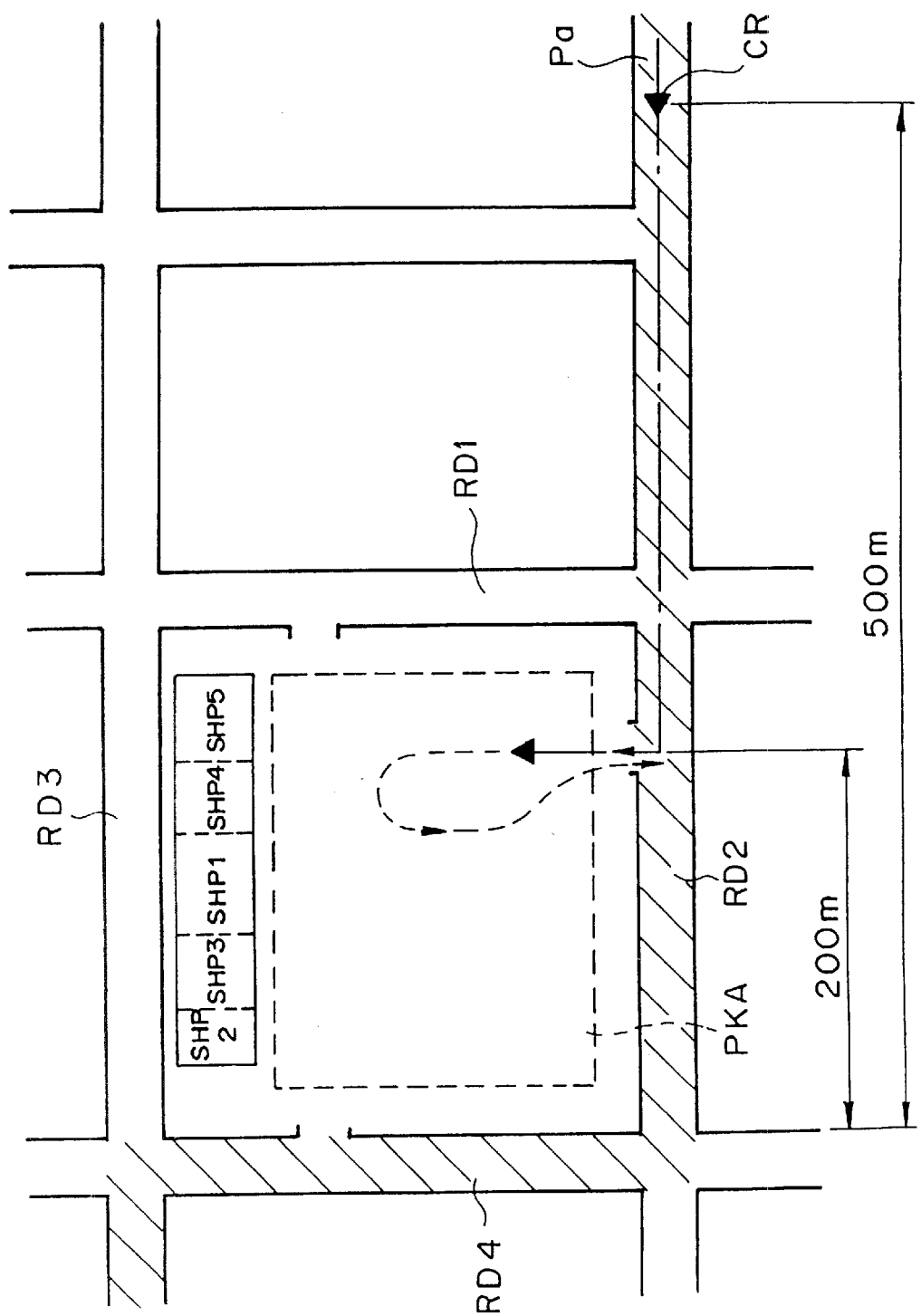
FIG. 13 is a diagram explaining displayed pictures (Part 1)
Figure 14B:
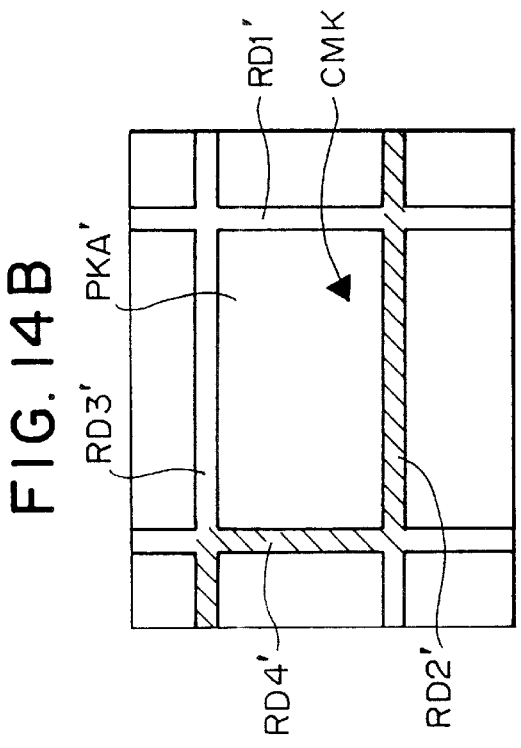
FIGS. 14A to 14D are diagrams explaining displayed pictures (Part 2)
Figure 14D:
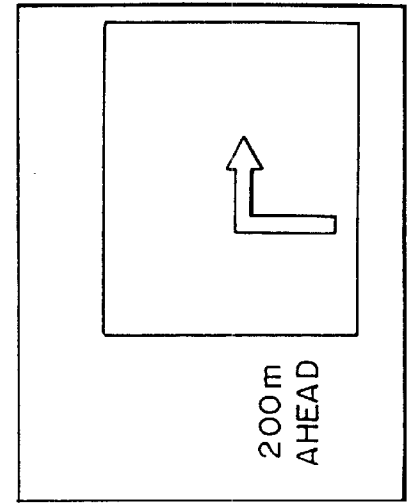
Figure 14A:
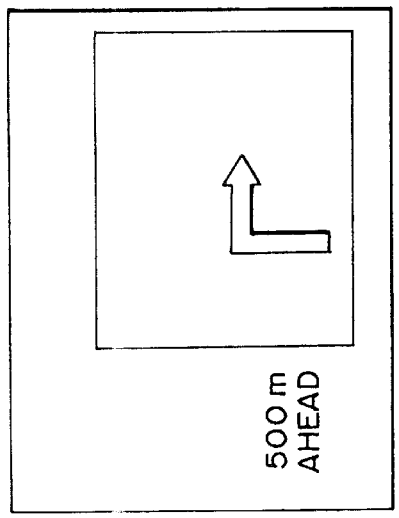
Figure 14C:
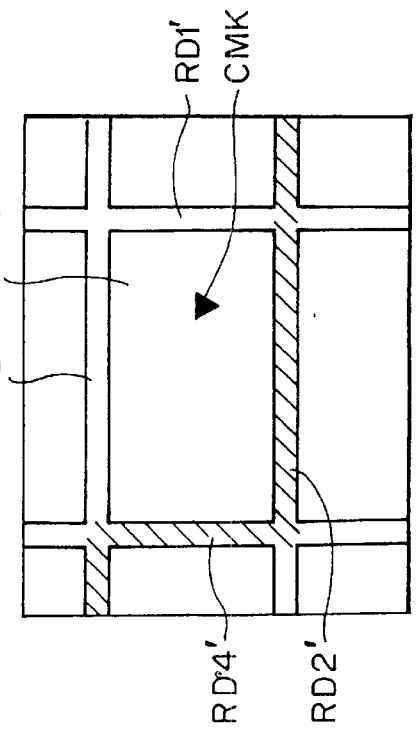

In the above-described map matching control and guidance control, if the vehicle CR enters parking area PKA, moves as indicated by the broken line in FIG. 13 returns to the guide route (hatched) through the entrance/exit through which the vehicle has entered the area, guidance pictures and map pictures are displayed on the display unit as shown in FIGS. 14A to 14D. That is, in a case where a guided route is set as indicated by the hatching in FIG. 13 and where the vehicle CR is moving leftward through a point Pa, a guidance picture such as shown in FIG. 14A designating a right turn 500 m ahead is displayed. In such a situation, if the vehicle enters parking area PKA, the display is immediately changed to show a map picture as shown in FIG. 14B. Thereafter, vehicle position mark CMK is displayed by being moved in map parking area PKA' according to the movement of the vehicle in the parking area, as shown in FIG. 14C. In this case, position correction based on map matching control is not performed, so that vehicle position mark CMK is not displayed on any road. When the vehicle returns to the guide route (hatched) by exiting the parking area PKA through the entrance/exit through which it entered the parking area PKA, the display is changed to show a guidance picture as shown in FIG. 14D according to the guided route. Thereafter, the position correction function based on map matching control and the function of recalculating a guide route in response to off-route travel are again started.

Figure 15:
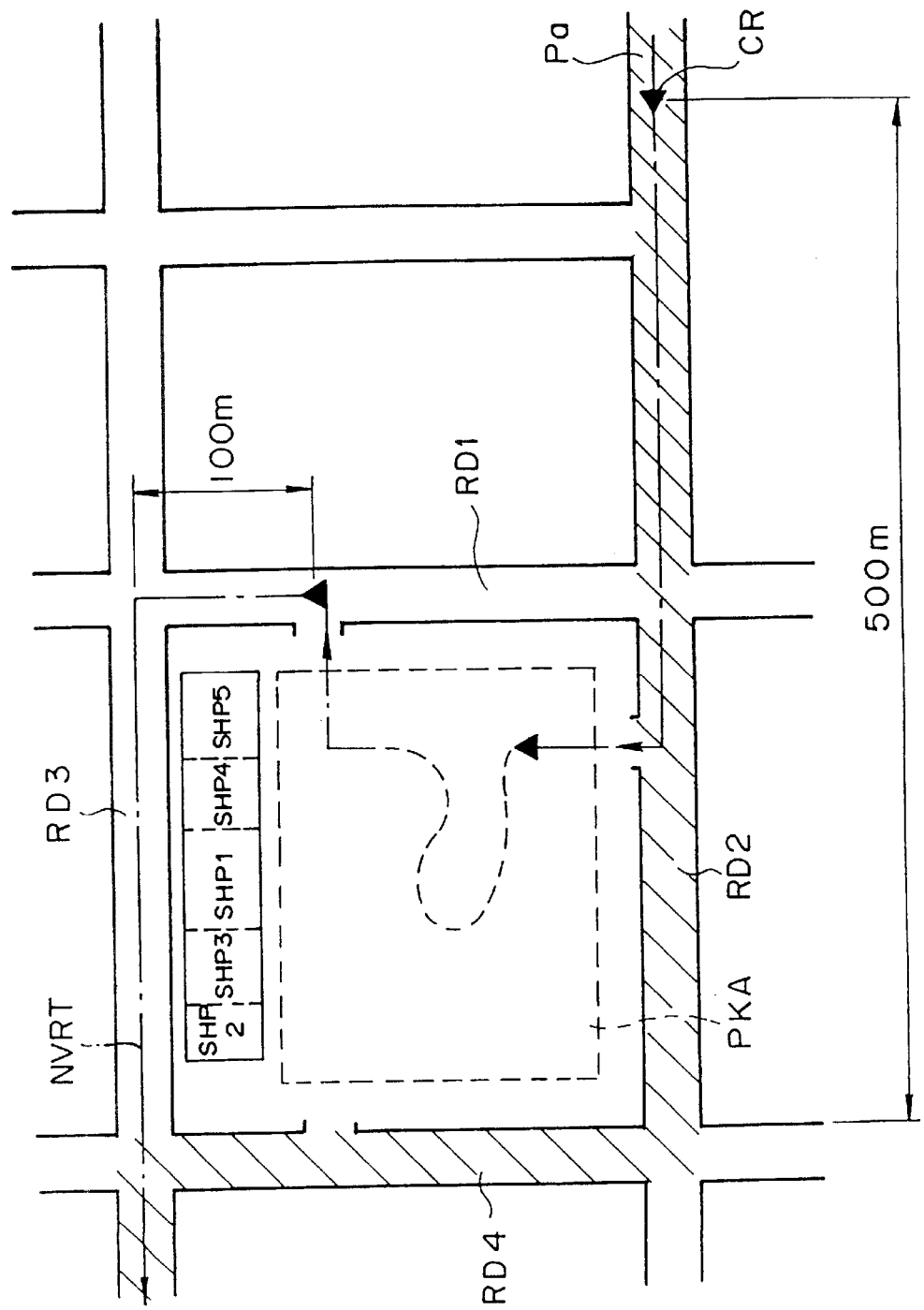
FIG. 15 is a diagram explaining displayed pictures in a case where an entrance and an exit are provided in difference places (Part 1)
Figure 16B:
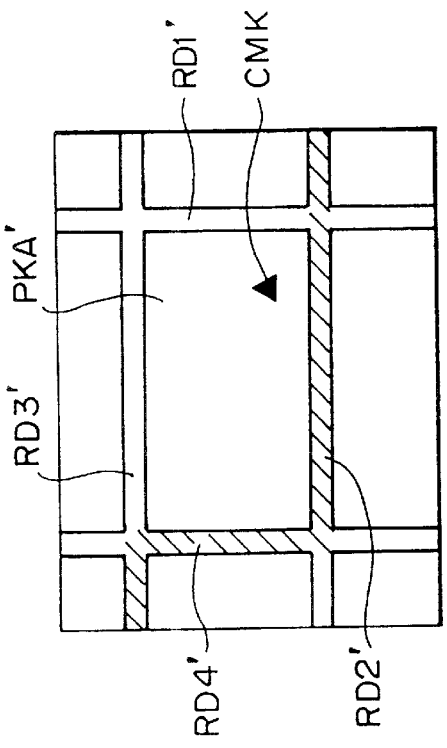
FIGS. 16A to 16D are diagrams explaining displayed pictures for a case where an entrance and an exit are provided in difference places (Part 2)
Figure 16D:
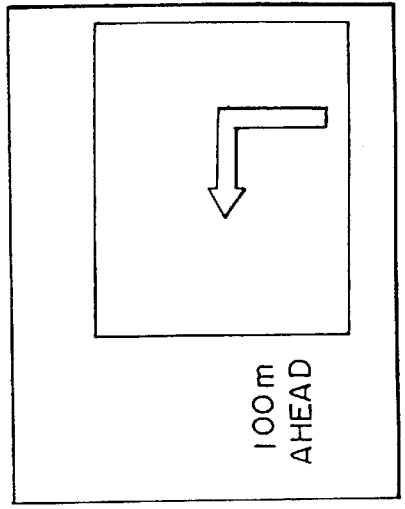
Figure 16A:
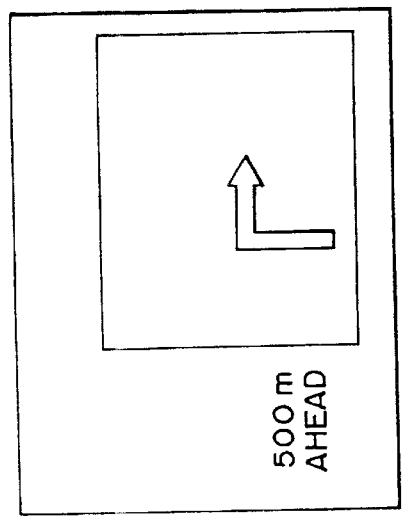
Figure 16C:
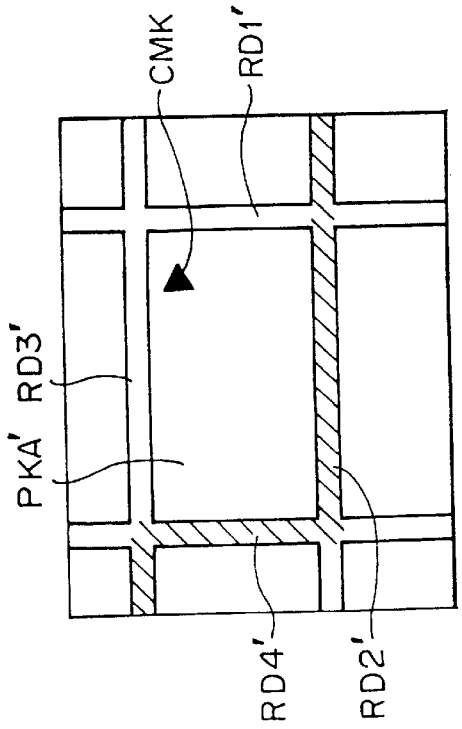
Figure 17:
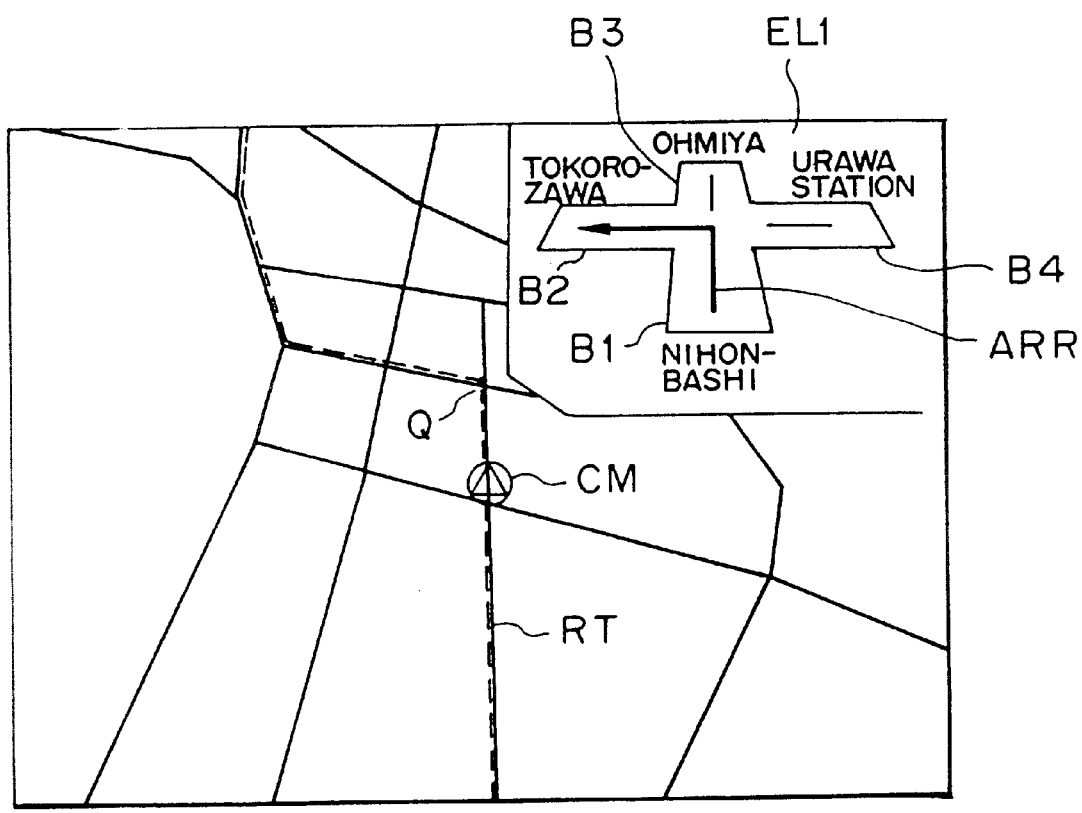
FIG. 17 is a diagram explaining prior art intersection guidance.
Figure 18:
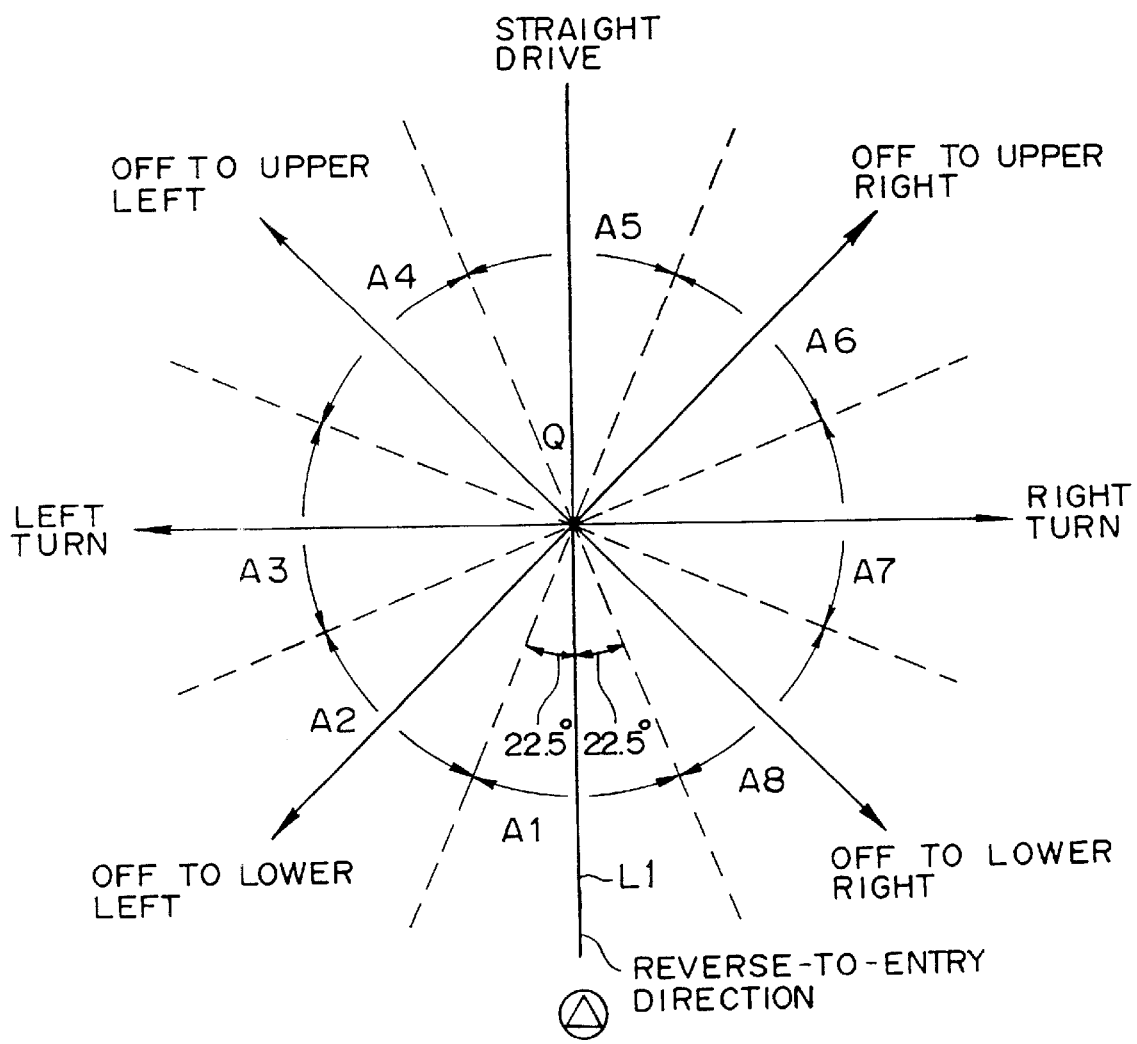
FIG. 18 is a table showing a prior art method of drawing an enlarged intersection diagram.
Figure 20A:
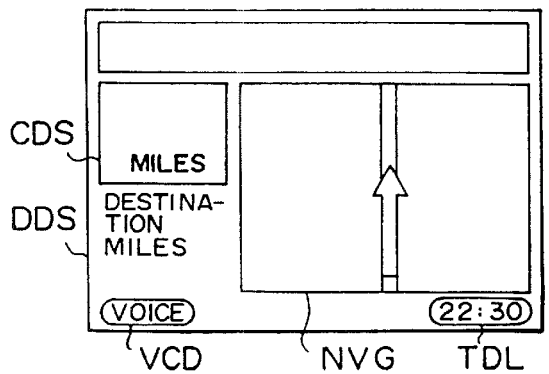
FIGS. 20A to 20F are diagrams of prior art guidance pictures.
Figure 20B:
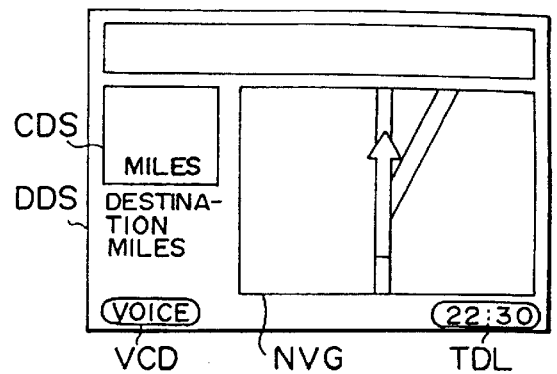
Figure 20C:
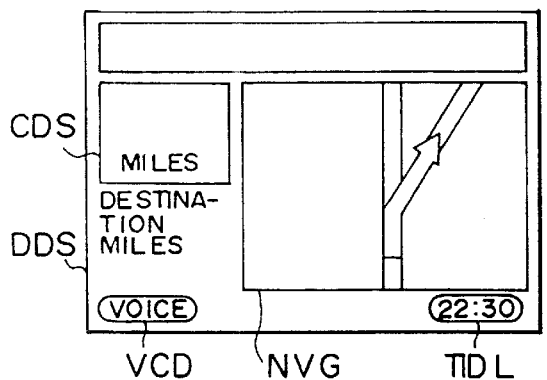
Figure 20D:
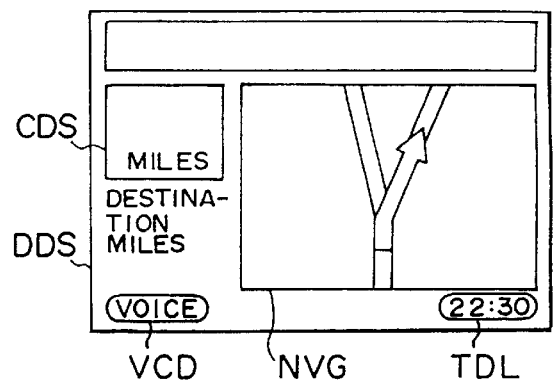
Figure 20E:
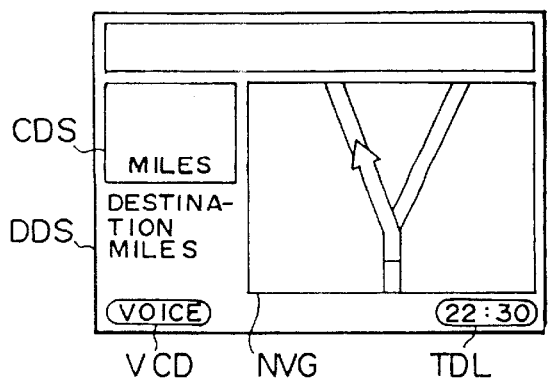
Figure 20F:
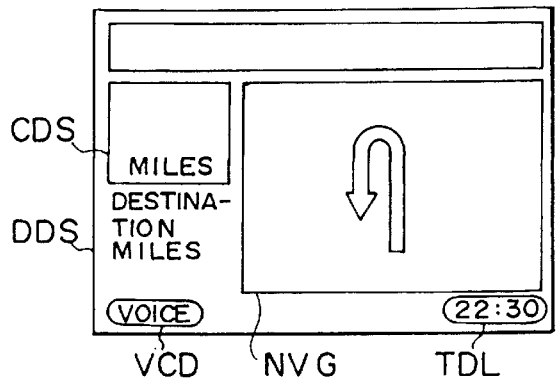
Figure 21:
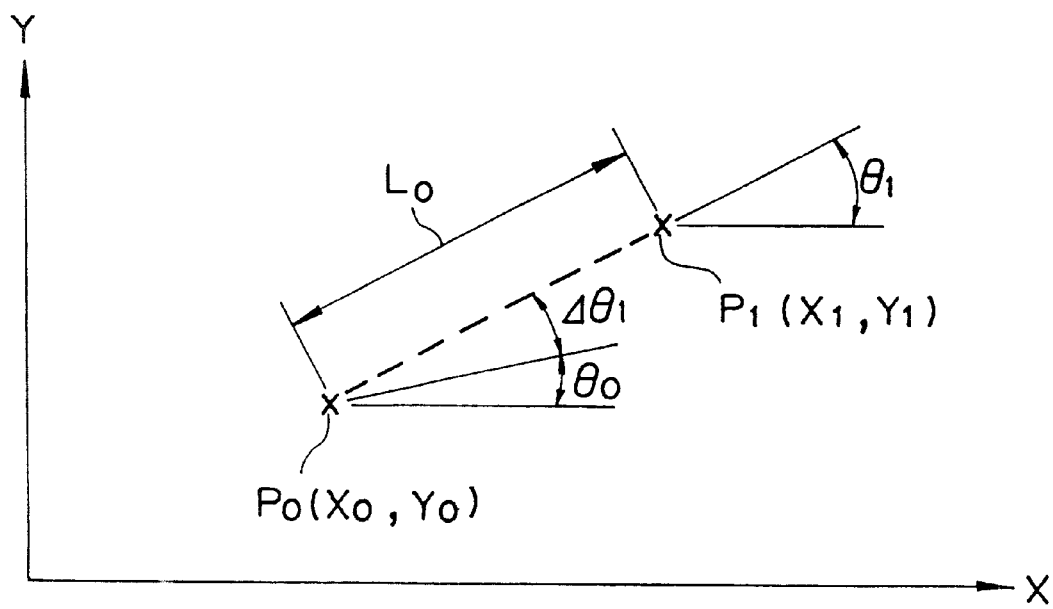
FIG. 21 is a diagram of a prior art method of calculating a position and a bearing in self-contained navigation.
Figure 22:
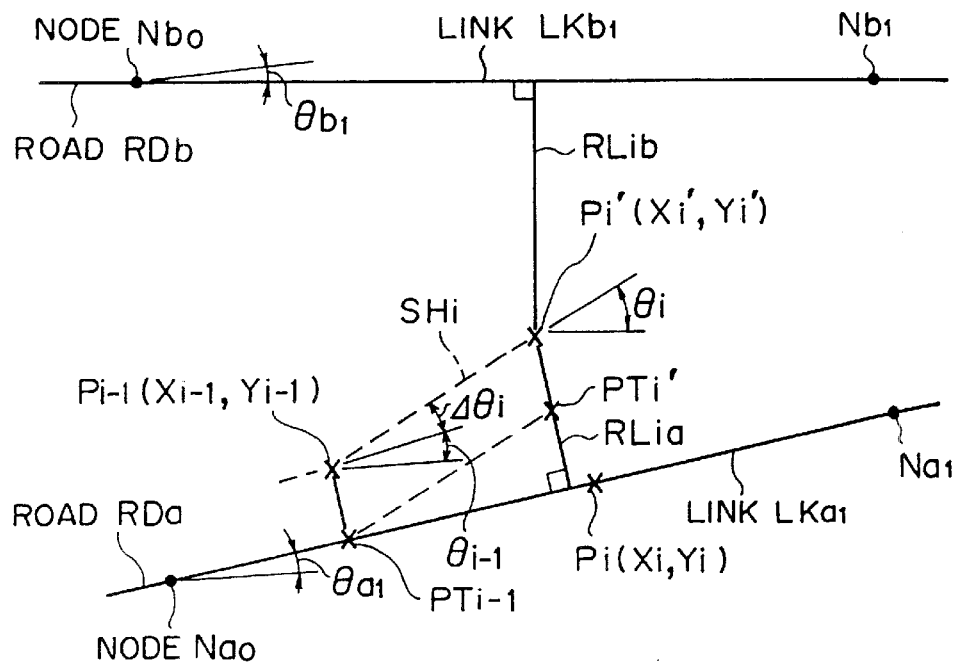
FIG. 22 is a diagram of map matching based on the prior art projection method (Part 1)
Figure 23:
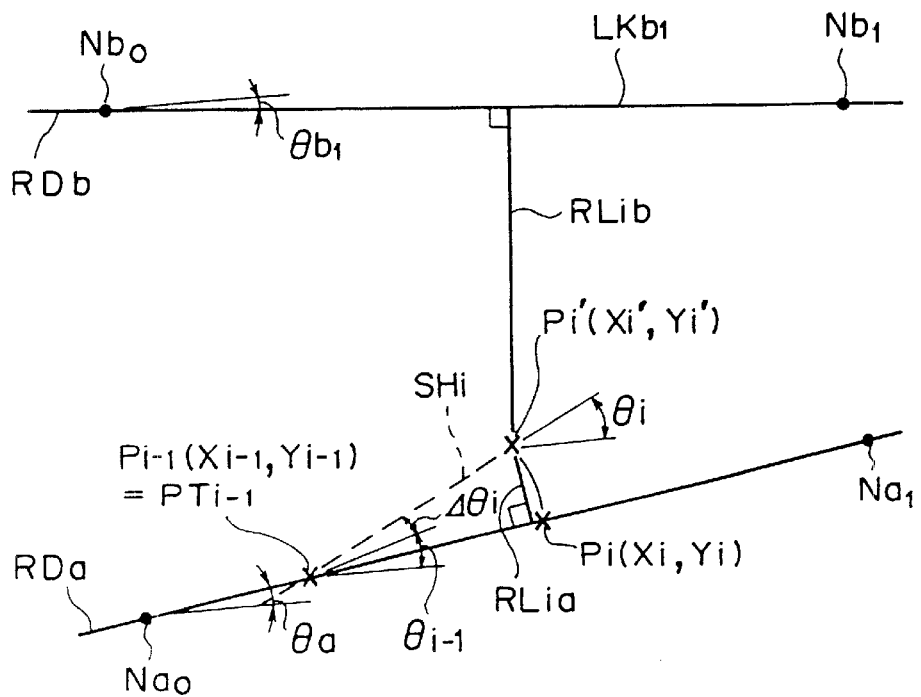
FIG. 23 is a diagram of map matching based on the prior art projection method (Part 2)
Figure 24:
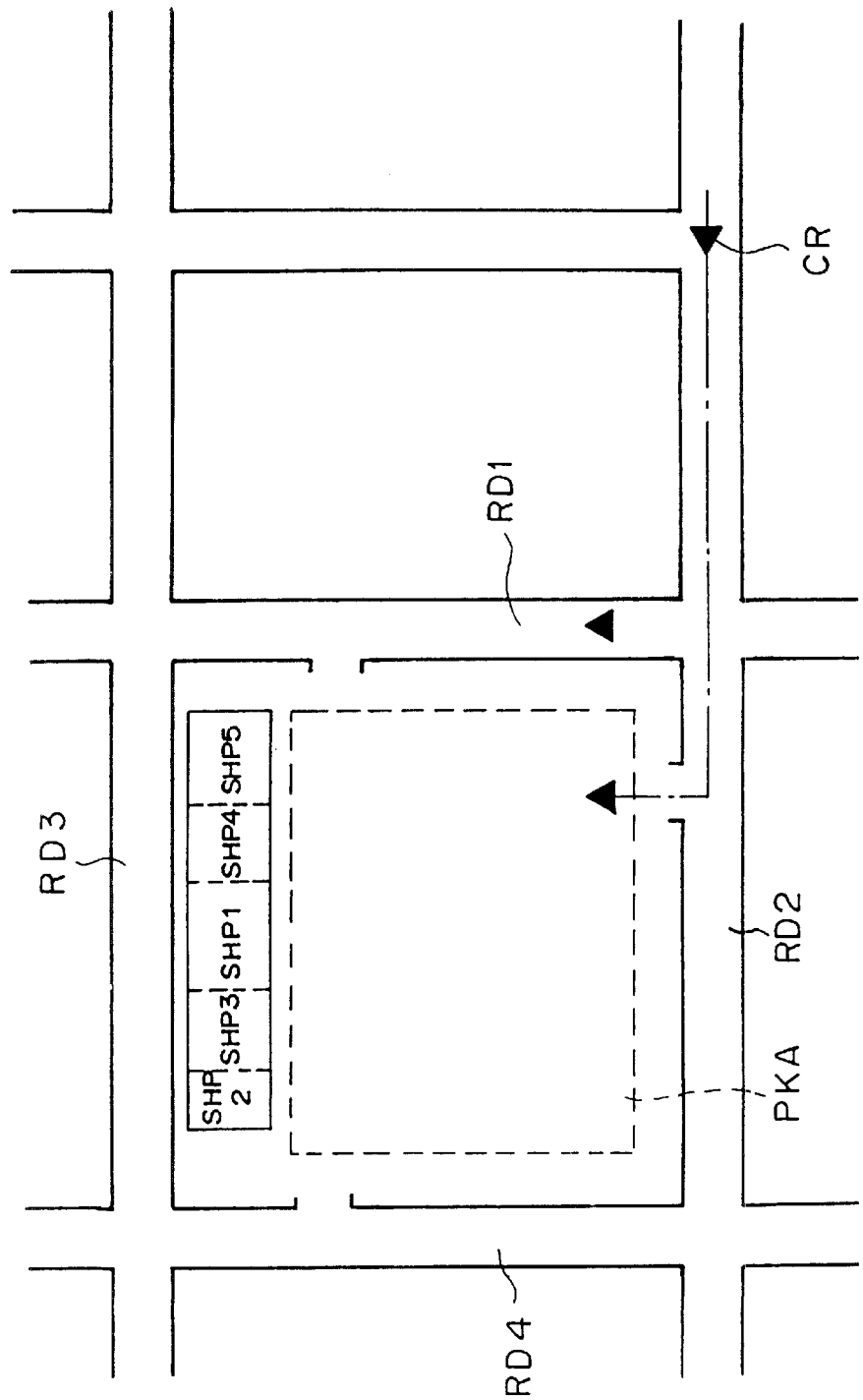
FIG. 24 is a diagram explaining the problem with the prior art navigation apparatus (Part 1)
Figure 25:
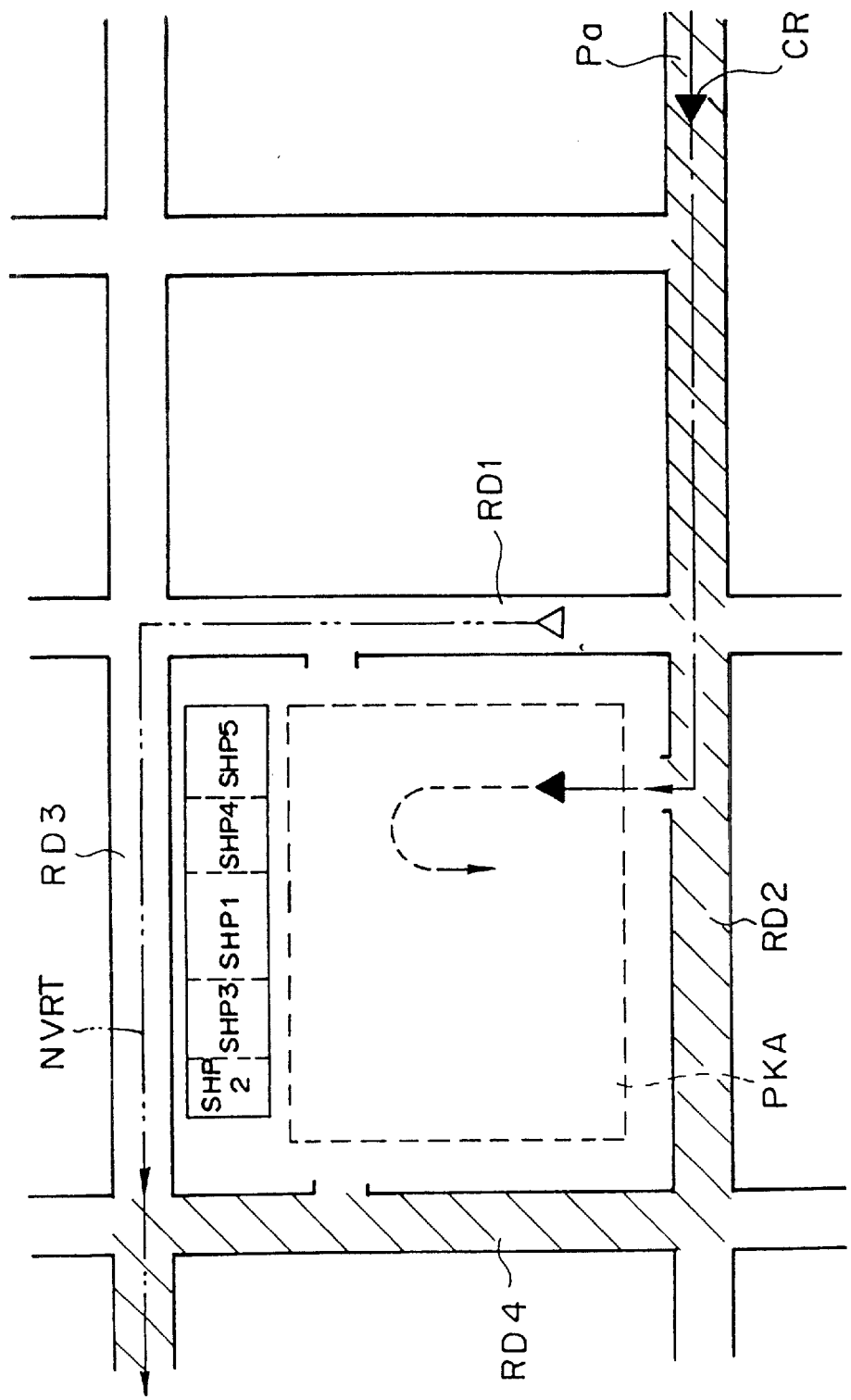
FIG. 25 is a diagram further explaining the problem with the prior art navigation apparatus (Part 2)
Figure 26A:
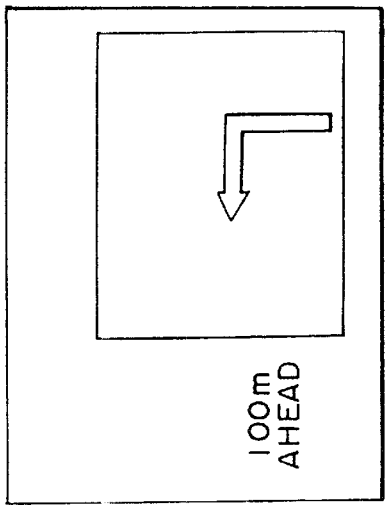
FIG. 26 is a diagram further explaining the problem with the prior art navigation apparatus (Part 3).
Figure 26B:
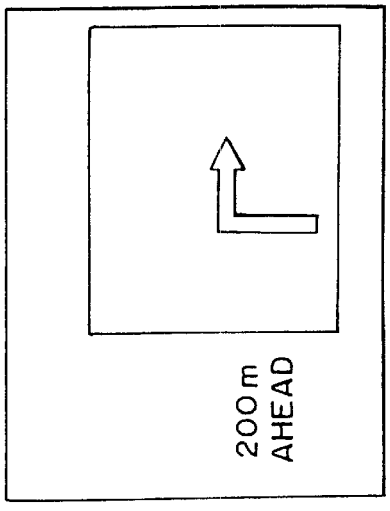
Figure 26C:
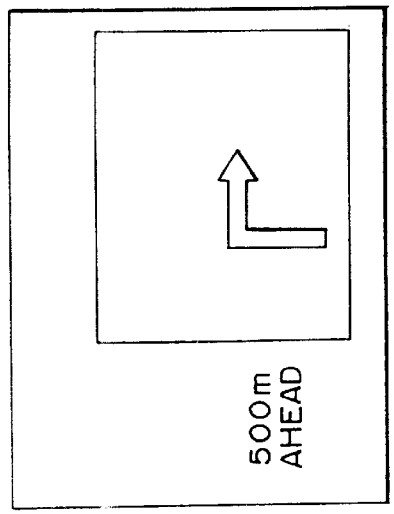
Figure 26D:
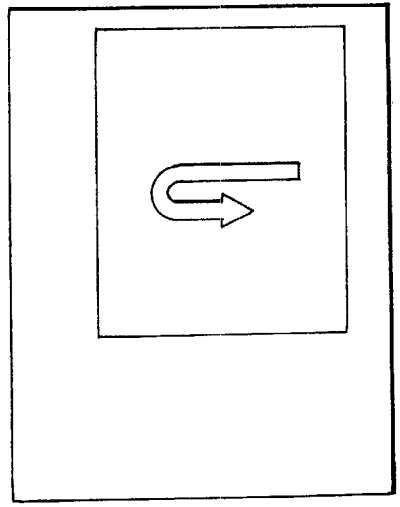

In one case, the vehicle enters into and exits from parking area PKA through the same entrance/exit. If an entrance and an exit are provided in different places as shown in FIG. 15, guidance pictures and map pictures are displayed on the display unit as shown in FIGS. 16A to 16D. That is, where a guided route is set as indicated by the hatching in FIG. 15 and where the vehicle CR is moving leftward through a point Pa, a guidance picture as shown in FIG. 16A designating a right turn 500 m ahead is displayed. In such a situation, if the vehicle enters parking area PKA, the display is immediately changed to show a map picture as shown in FIG. 16B. Thereafter, Vehicle position mark CMK is displayed by being moved in map parking area PKA' according to the movement of the vehicle in the parking area PKA, as shown in FIG. 16C. When the vehicle travels on a road RD1 different from the guided route after exiting from the parking area PKA through an entrance/exit different from the one through which it entered the parking area PKA, a new guided route is immediately recalculated in response to the off-route travel, thereby obtaining a guided route NVRT indicated by the broken line with an arrow in FIG. 15. The display is then changed to show a guidance picture as shown in FIG. 16D according to the guided route NVRT to navigate the vehicle to the destination.

Examples of Modifications

The present invention has been described with respect to a case where, when the vehicle enters an off-road net area, a guidance picture is changed for a map picture, the processing for correcting the vehicle position by map matching control stops, and recalculating a guided route in response to off-route travel also stops, and where, when the vehicle exits the area, the map picture is changed to a guidance picture, the processing for correcting the vehicle position by map matching control is restarted, and recalculation of a guided route in response to off-route travel is also restarted. However, the present invention is not limited to the arrangement described above and may be modified as described below.

That is, the arrangement is alternatively such that, when the vehicle enters an off-road area, a guidance picture is changed to a map picture, and that, when the vehicle exits the area, the map picture is changed to a guidance picture.

Further, the arrangement alternatively is such that, when the vehicle enters an off-road net area, a guidance picture is changed to the map picture and the processing for correcting the vehicle position by map matching control stops, and that, when the vehicle exits the area, a map picture is changed to a guidance picture and the processing for correcting the vehicle position by map matching control is restarted.

Concerning the condition of area exit detection in this embodiment, the vehicle speed must be higher than 32 km/h in order to determine the vehicle exits a parking lot.

However, if the road leading away from the parking lot is crowded, the 32 km/h condition of the vehicle speed is not satisfied. In order to overcome this situation, the following determination is effective for determining area exit detection. The condition is 1) if the vehicle drives slowly, i.e. vehicle speed is less than 32 km/h, and
2) the same candidate road exists on which map matching is to be performed sequentially during a certain period.

However, the present invention can be modified in other various ways without departing from the scope of the invention set forth in the appended claims, and is to be construed to include any such changes and modifications, as will be apparent to one skilled in the art in light of this disclosure.

What is claimed is:

1. A navigation apparatus which displays a guidance picture for navigating a vehicle to a destination, said navigation apparatus comprising:

a map database storing road network data and map data for a first predetermined area;

a detector which detects the vehicle position and whether the vehicle is traveling on any road in the road network data or is traveling in a second area off any road in the road network data, wherein said second area is included in said first predetermined area;

a guidance control section coupled to the map database and to the detector and which searches a route from a present vehicle position to a destination on the basis of the road network data and which provides the guidance picture based upon the detected vehicle position on the searched route; and a display control means coupled to the detector and to the map database for displaying the guidance picture based on the vehicle position on the route when the vehicle is detected traveling on a road in the road network data, and for changing the display of the guidance picture to a map picture showing a map image and the vehicle position on the map when the vehicle is detected entering said second area off any road in the road network data.

2. A navigation apparatus according to claim 1, further comprising a second detector coupled to said guidance control section and which detects an exit of the vehicle from the second area, wherein, if the vehicle is detected exiting the second area, said display control means changes the map picture to the guidance picture.

3. A navigation apparatus according to claim 1, wherein said second area is off any road in the road network data and is one of a parking lot, a campus, facility grounds, and a park.

* * * * *